US012630018B2

(12) United States Patent
Larsson et al.

(10) Patent No.: US 12,630,018 B2
(45) Date of Patent: May 19, 2026

(54) GUIDANCE DATA FOR VEHICLES DRIVING RELATIVE TO A CURVE USING AUGMENTED REALITY (AR)

(71) Applicant: QUALCOMM Incorporated, San Diego, CA (US)

(72) Inventors: Annika Larsson, Mölndal (SE); Shabin Mahadevan, Lake Orion, MI (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 18/746,705

(22) Filed: Jun. 18, 2024

(65) Prior Publication Data

US 2025/0381845 A1      Dec. 18, 2025

(51) Int. Cl.
| | |
|---|---|
| *B60K 35/235* | (2024.01) |
| *B60K 35/28* | (2024.01) |
| *B60W 40/08* | (2012.01) |
| *B60W 50/16* | (2020.01) |
| *G06V 20/59* | (2022.01) |
| *H04W 4/40* | (2018.01) |
| *B60W 50/14* | (2020.01) |

(52) U.S. Cl.
CPC ............ *B60K 35/235* (2024.01); *B60K 35/28* (2024.01); *B60W 40/08* (2013.01); *B60W 50/16* (2013.01); *G06V 20/597* (2022.01); *H04W 4/40* (2018.02); *B60K 2360/177* (2024.01); *B60K 2360/1868* (2024.01); *B60K 2360/589* (2024.01); *B60W 2040/0818* (2013.01); *B60W 2050/143* (2013.01); *B60W*

*2050/146* (2013.01); *B60W 2300/36* (2013.01); *B60W 2420/403* (2013.01); *B60W 2540/225* (2020.02); *B60W 2540/229* (2020.02); *B60W 2552/30* (2020.02); *B60W 2556/65* (2020.02)

(58) Field of Classification Search
CPC    B60K 35/235; B60K 35/28; B60K 2360/186; B60K 2360/589; B60K 2360/177; H04W 4/40; G06V 20/597; B60W 40/08; B60W 50/16; B60W 2540/225; B60W 2540/229; B60W 2552/30; B60W 2556/65; B60W 2040/0818; B60W 2050/143; B60W 2050/146; B60W 2300/36; B60W 2420/403
USPC ...................................................... 340/425.5
See application file for complete search history.

(56) References Cited

U.S. PATENT DOCUMENTS

| | | | | |
|---|---|---|---|---|
| 7,124,852 | B2 * | 10/2006 | Hasegawa | ................ B62H 5/20 |
| | | | | 180/282 |
| 9,580,009 | B1 * | 2/2017 | Lenker | ..................... B60Q 1/52 |
| 9,840,239 | B2 * | 12/2017 | Meier | ................... B60T 8/1706 |

(Continued)

*Primary Examiner* — Zhen Y Wu
(74) *Attorney, Agent, or Firm* — Polsinelli

(57) ABSTRACT

Disclosed are systems and techniques for providing rider assistance. For example, a computing device can obtain driving data associated with at least one of a vehicle, a rider of the vehicle, or an environment of the vehicle while the rider is driving the vehicle on a road. The computing device can determine, based on the driving data, driving guidance data for the rider for driving the vehicle through a curve in the road. The computing device can output the driving guidance data for display on a display of a head-mounted device (HMD) associated with the rider.

16 Claims, 13 Drawing Sheets

(56) References Cited

U.S. PATENT DOCUMENTS

| | | | | |
|---|---|---|---|---|
| 2015/0294570 A1* | 10/2015 | Emura | .................... | G06T 11/00 340/435 |
| 2015/0332103 A1* | 11/2015 | Yokota | ................ | G06F 16/5854 348/149 |
| 2016/0084661 A1* | 3/2016 | Gautama | ................ | G01C 21/26 701/400 |
| 2016/0334623 A1* | 11/2016 | Kishi | ................... | G02B 27/017 |
| 2017/0010613 A1* | 1/2017 | Fukumoto | ........ | G08G 1/096844 |
| 2017/0101081 A1* | 4/2017 | Meier | .................. | B60T 8/1766 |
| 2017/0158195 A1* | 6/2017 | Uchida | .............. | B60W 30/143 |
| 2022/0026237 A1* | 1/2022 | Daniel | .............. | G01C 21/3841 |
| 2024/0053163 A1* | 2/2024 | Shtok | ................... | G01C 21/365 |
| 2024/0078821 A1* | 3/2024 | Forzy | ................... | B60W 40/08 |
| 2024/0328810 A1* | 10/2024 | Lochmann | ............ | G06T 19/006 |
| 2024/0417021 A1* | 12/2024 | Labianca | ................ | B62J 45/42 |

* cited by examiner

Entering Curve Phase 430a

Inside Curve Phase 430b

Out of Curve Phase 430c

410

410

410

420a

420b

420c

420d

420e

420f

420g r1 r2 r3

400

700

705 Tilt (gyro)

725 Data storage

715 Front vision (camera)

Vehicle (e.g., motorcycle, bicycle, etc.)

710

745 GPS

730 Cloud connection

735 Wifi

740 ECU (e.g., front vision used for curve modelling)

755 Wifi

750 Head tracking (gyro)

720 HMD (e.g., Helmet HMD)

765 HUD

760 ECU

900

935 — Wifi

905 — Tilt (gyro)

925 — Data storage

Front vision (camera) — 915

Vehicle (e.g., motorcycle, bicycle, etc.) — 710

930 — Cloud connection

945 — GPS

ECU (e.g., front vision used for curve modelling, sensor fusion with helmet front vision) — 940

955 — Wifi

Front vision (camera) — 955

920 — HMD (e.g., Helmet HMD)

Head tracking (gyro) — 950

960 — ECU

965 — HUD

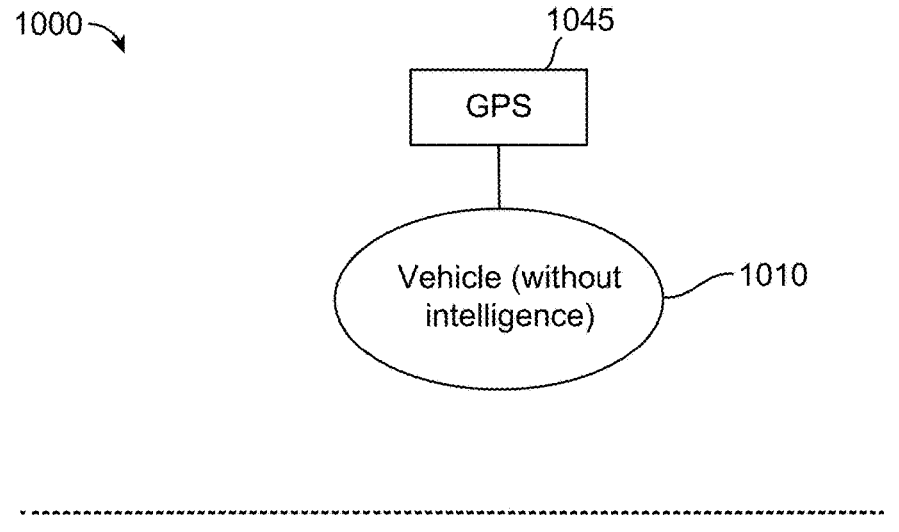
1000
1045
GPS
Vehicle (without intelligence)
1010
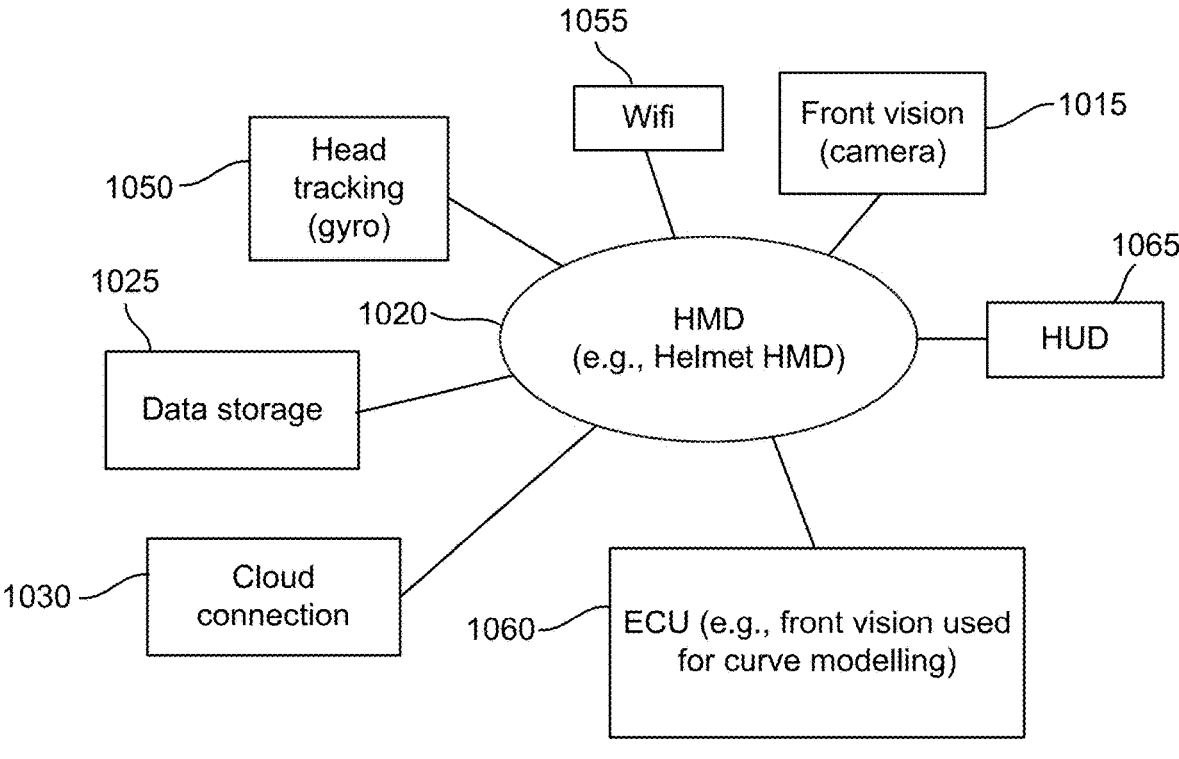
1055
Wifi
Front vision (camera)
1015
Head tracking (gyro)
1050
1025
1020
HMD (e.g., Helmet HMD)
HUD
1065
Data storage
Cloud connection
1030
1060
ECU (e.g., front vision used for curve modelling)
FIG. 10

1200

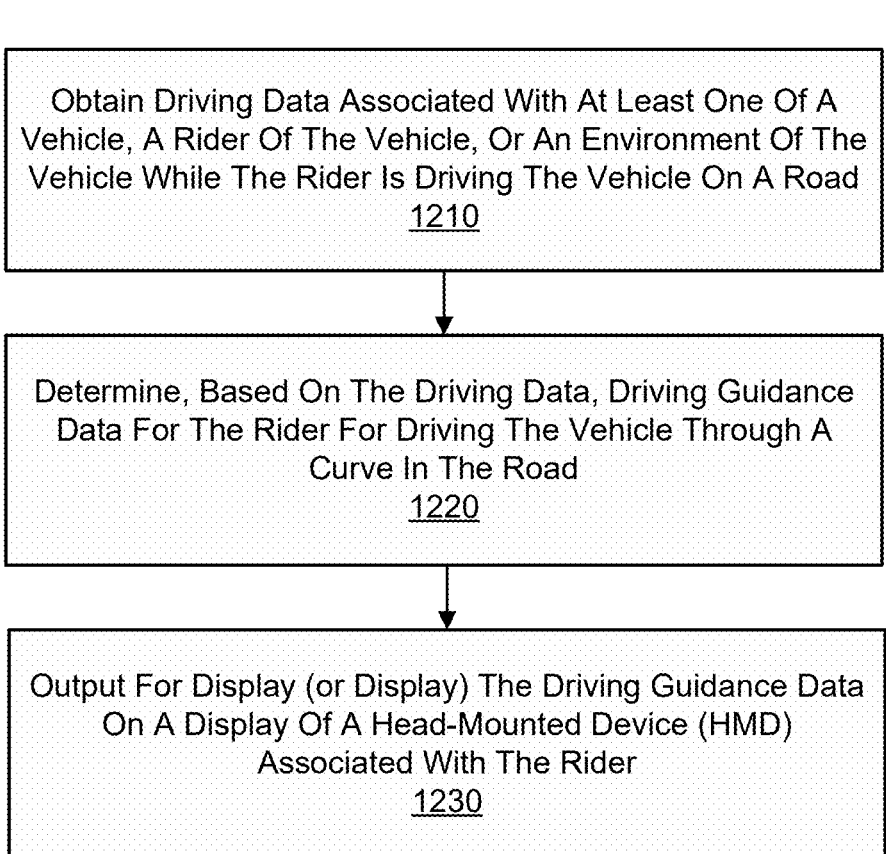

Obtain Driving Data Associated With At Least One Of A Vehicle, A Rider Of The Vehicle, Or An Environment Of The Vehicle While The Rider Is Driving The Vehicle On A Road
1210

Determine, Based On The Driving Data, Driving Guidance Data For The Rider For Driving The Vehicle Through A Curve In The Road
1220

Output For Display (or Display) The Driving Guidance Data On A Display Of A Head-Mounted Device (HMD) Associated With The Rider
1230

FIG. 12

GUIDANCE DATA FOR VEHICLES DRIVING RELATIVE TO A CURVE USING AUGMENTED REALITY (AR)

FIELD

The present disclosure generally relates to driving assistance. For example, aspects of the present disclosure relate to providing guidance data for riders of vehicles (e.g., motorcycles, bicycle, scooter, etc.) driving into or through a curve using augmented reality (AR) (e.g., generated and/or displayed by an AR helmet or glasses worn by the rider).

BACKGROUND

Increasingly, systems and devices (e.g., autonomous vehicles, such as autonomous and semi-autonomous cars, motorcycles, drones, mobile robots, mobile devices, extended reality (XR) devices, and other suitable systems or devices) include multiple sensors to gather information about the environment, as well as processing systems to process the information gathered, such as for route planning, navigation, collision avoidance, etc. One example of such a system is an Advanced Driver Assistance System (ADAS) for a vehicle. Sensor data, such as images, captured from one or more image sensors of cameras and/or radar data captured from one or more radar sensors, may be gathered, transformed, and analyzed for enhancing driving safety.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems and techniques for providing driving assistance for riders of a vehicle (e.g., a motorcycle, bicycle, scooter, etc.). According to at least one example, an apparatus for rider assistance is provided. The apparatus includes at least one memory and at least one processor coupled to the at least one memory and configured to: obtain driving data associated with at least one of a vehicle, a rider of the vehicle, or an environment of the vehicle while the rider is driving the vehicle on a road; determine, based on the driving data, driving guidance data for the rider for driving the vehicle through a curve in the road; and output the driving guidance data for display on a display of a head-mounted device (HMD) associated with the rider.

In some aspects, a method for rider assistance is provided. The method includes: obtaining, by a processor, driving data associated with at least one of a vehicle, a rider of the vehicle, or an environment of the vehicle while the rider is driving the vehicle on a road; determining, by the processor based on the driving data, driving guidance data for the rider for driving the vehicle through a curve in the road; and displaying, on a display of a head-mounted device (HMD) associated with the rider, the driving guidance data.

In some aspects, a non-transitory computer-readable medium is provided having stored thereon instructions that, when executed by at least one processor, cause the at least one processor to: obtain driving data associated with at least one of a vehicle, a rider of the vehicle, or an environment of the vehicle while the rider is driving the vehicle on a road; determine, based on the driving data, driving guidance data for the rider for driving the vehicle through a curve in the road; and output the driving guidance data for display on a display of a head-mounted device (HMD) associated with the rider.

In some aspects, an apparatus for rider assistance is provided. The apparatus includes: means for obtaining driving data associated with at least one of a vehicle, a rider of the vehicle, or an environment of the vehicle while the rider is driving the vehicle on a road; means for determining, based on the driving data, driving guidance data for the rider for driving the vehicle through a curve in the road; and means for displaying the driving guidance data.

In some aspects, each of the apparatuses described above is, can be part of, or can include an extended reality (XR) device (e.g., a virtual reality (VR) device, an augmented reality (AR) device, or a mixed reality (MR) device). In some examples, the apparatuses can include or be part of a vehicle (e.g., a car, motorcycle, bicycle, or scooter). In some aspects, the apparatus(es) can include an image sensor (e.g., a camera) or multiple image sensors (e.g., multiple cameras) for capturing one or more images. In some aspects, the apparatus (cs) can include one or more displays for displaying one or more guidance data (e.g., AR guidance data), images, notifications, and/or other displayable data. In some aspects, the apparatus includes one or more speakers, one or more light-emitting devices, and/or one or more microphones. In some aspects, the apparatus(es) can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Illustrative aspects of the present application are described in detail below with reference to the following figures:

FIG. 10 is a diagram illustrating a fourth example of a configuration of a rider's HMD and vehicle for a no eye-tracking solution for guiding the vehicle through a curve in a road, in accordance with some aspects of the disclosure.

FIG. 12 is a flow diagram illustrating an example of a process for driving assistance for a rider of a vehicle, in accordance with some aspects of the disclosure.

DETAILED DESCRIPTION

Figure 1:
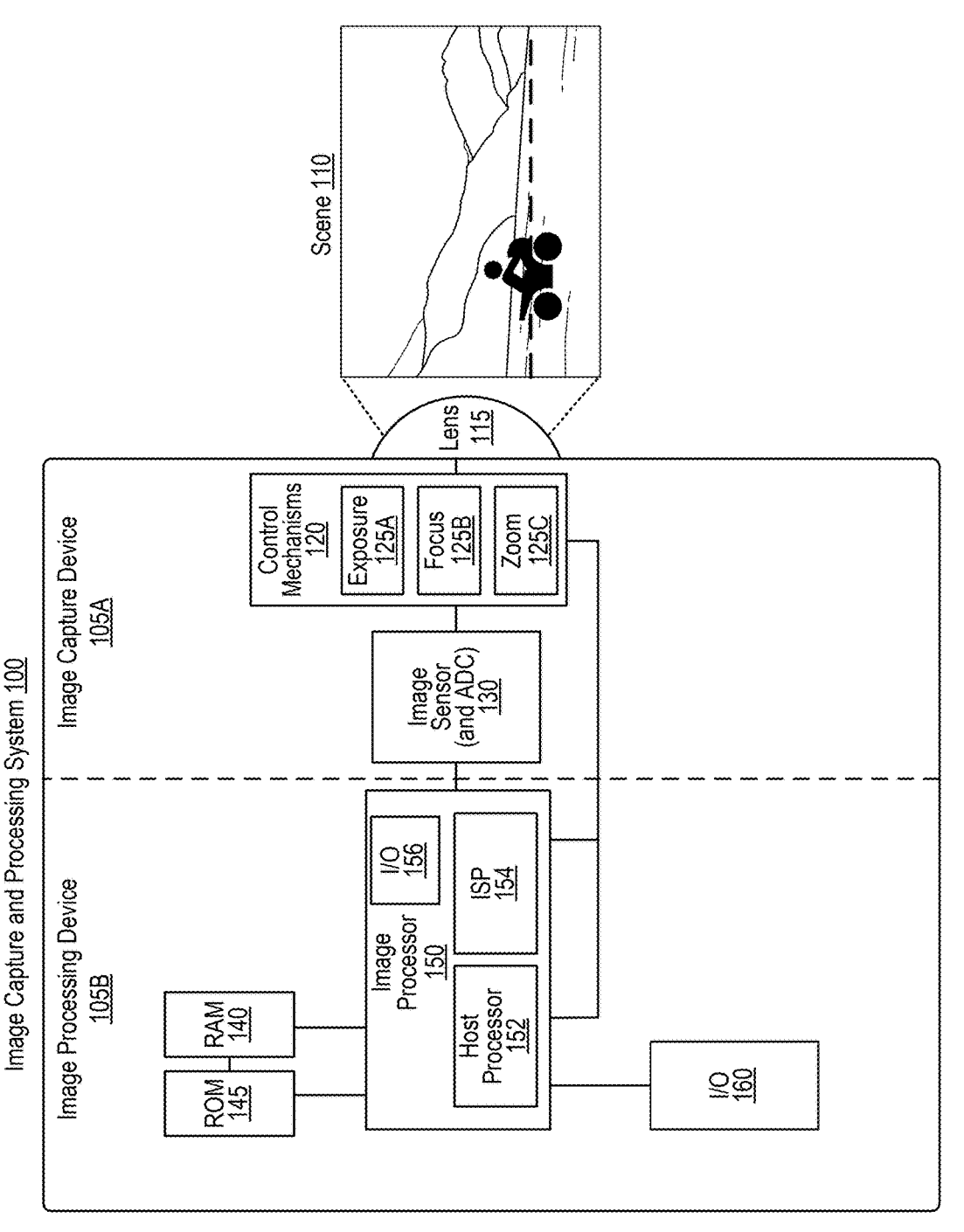
FIG. 1 is a block diagram illustrating an architecture of an image capture and processing system, in accordance with aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

As previously mentioned, increasingly, systems and devices (e.g., autonomous vehicles, such as autonomous and semi-autonomous cars, motorcycles, drones, mobile robots, mobile devices, XR devices, and other suitable systems or devices) include multiple sensors to gather information about the environment, as well as processing systems to process the information gathered, such as for route planning, navigation, collision avoidance, etc. One example of such a system is an ADAS for a vehicle. Another example is an Advanced Rider Assistance Systems (ARAS) for powered two wheelers (e.g., motorcycles, etc.). Sensor data, such as images, captured from one or more image sensors of cameras and/or radar data captured from one or more radar sensors, may be gathered, transformed, and analyzed for enhancing driving safety.

When riding a motorcycle, many riders (e.g., users) experience collisions due to driving at an incorrect speed when entering a curve, or due to leaning the motorcycle the wrong way and/or at an incorrect angle. Currently, however, current systems do not use vehicle information (e.g., motorcycle information) and contextual information of an environment (e.g., map and environment sensing information) to enhance the capabilities of the rider for driving safety. As such, improved systems and techniques that enhance the capabilities of riders of motorcycles for driving safety can be beneficial.

In one or more aspects, systems, apparatuses, processes (also referred to as methods), and computer-readable media (collectively referred to herein as "systems and techniques") are described herein for providing guidance data for riders of vehicles (e.g., motorcycles, bicycle, scooter, etc.) driving into or through a curve using augmented reality (AR) (e.g., generated and/or displayed by an AR helmet or glasses worn by the rider).

Various aspects relate generally to driving assistance. Some aspects more specifically relate to systems and techniques that provide solutions for guiding riders to ride motorcycles in a safer way by providing to the riders recommended leaning angles, speeds, and/or paths for known as well as unknown curves in roads. In one or more aspects, an AR display on a motorcycle rider's helmet can display guidance related to a recommended lean angle, speed, and/or path when driving through a curve in a road. This guidance can be based on data collected from sensors implemented within the helmet, sensors implemented within the motorcycle, maps, road condition data, and/or crowd-sourced data (e.g., data indicating how other riders performed on a particular curve).

In one or more aspects, for a motorcycle being driven by a rider at a high speed when entering a curve in a road, an HMD (e.g., a helmet HMD with a helmet visor) of the rider can display AR guidance on how much and when the rider should lean, based on the curve radius, road conditions, traffic conditions, and/or the motorcycle speed. The AR guidance can also indicate to the rider whether to speed up or slow down, and where within the road to do so. In one or more examples, when the rider's eye gaze and/or helmet pose is not pointed in a direction of a curve in the road that lies ahead, the AR guidance can provide the guidance information to the rider prior to the motorcycle entering the curve such that the rider has sufficient enough time to adapt (e.g., adjust his eye gaze and/or head pose in the direction of the upcoming curve). In some examples, a gyroscope may be employed (e.g., implemented within the motorcycle and/or the rider's helmet) to maintain a stable visualization of the road on the display of the rider's helmet. In one or more examples, a coarse localization for the motorcycle can be determined based on map data, Global Positioning System (GPS) data, camera sensor data, and/or radar sensor data. In some examples, when the road has a large amount of friction, the AR guidance can also indicate to the rider a more conservative speed and leaning approach. In some examples, when GPS data is not available, a location of the motorcycle can be determined by using sensor data obtained by sensors implemented within the motorcycle and/or the rider's helmet. In one or more examples, collective and individual maps using feedback from the rider to indicate when they are starting to turn the motorcycle into a curve can be used to customize how early or late AR guidance prompts need to be given to the rider, based on the rider's previous driving experience on the same or similar roads.

In one or more aspects, during operation of the systems and techniques for driving assistance, a processor can obtain driving data associated with a vehicle, a rider of the vehicle, and/or an environment of the vehicle while the rider is driving the vehicle on a road. The processor can determine, based on the driving data, driving guidance data for the rider for driving the vehicle through a curve in the road. A display, of a head-mounted device (HMD) associated with the rider (e.g., a helmet HMD of a rider of a motorcycle), can display the driving guidance data.

In one or more examples, determining the driving guidance data can include determining initial driving guidance data for each point of a plurality of points of a poly-line representing the curve in the road. In some examples, the plurality of points can span a length of the curve in the road. In one or more examples, determining the driving guidance data can further include determining, based on the initial driving guidance data for each point of the plurality of points of the poly-line, final driving guidance data for each radius of a plurality of radii of the poly-line representing the curve in the road.

In some examples, each radius of the plurality of radii can include a respective portion of points of the plurality of points. In one or more examples, the driving guidance data can include a recommended lean angle for the rider, a recommended speed for the vehicle, and/or a recommended path to drive the vehicle within the curve in the road. In some examples, the driving guidance data can include a recommended lean angle for the rider. The driving guidance data can include a shape overlaid on an image of the road to indicate the recommended lean angle for the rider. In one or more examples, the driving guidance data can include a recommended speed for the vehicle. The driving guidance data can include a number overlaid on the image of the road to indicate the recommended speed for the vehicle. In some examples, the driving guidance data can include a recommended path to drive the vehicle within the curve in the road. The driving guidance data can include a virtual path overlaid on the image of the road to indicate the recommended path.

In one or more examples, the driving data can include radar data of the environment of the vehicle, camera image data of the environment of the vehicle, gyroscope data associated with the vehicle, gyroscope data associated with the HMD, GPS data indicating a location of at least one of the vehicle or the HMD, eye tracking camera image data of the rider, odometry data associated with the vehicle, traction data associated with vehicle, weather data associated with the environment of the vehicle, a current leaning angle of the rider, a current braking level associated with the vehicle, a current speed associated with the vehicle, and/or ultrasonic data associated with the vehicle.

In some examples, the driving data can include eye tracking camera image data of the rider. For these examples, the processor can determine, based on the eye tracking camera image data of the rider, that the rider is inattentive to the curve in the road. The processor can, based on determining the rider being inattentive to the curve in the road, output an alert to the rider via the HMD. In some examples, the alert can be a visual alert displayed on the display of the HMD and/or an audible alert output via a speaker of the HMD. Additionally or alternatively, in some cases, the alert can be a haptic alert, such as haptic feedback output within the HMD (e.g., in a helmet HMD) and/or output via one or more parts of the vehicle (e.g., a seat, handlebar, pedal, and/or other part of a motorcycle). For instance, the haptic feedback output via one or more parts of the vehicle can be triggered based on a command (e.g., a wireless command) transmitted from the HMD to the vehicle (e.g., to an ADAS or ARAS of the vehicle).

In one or more examples, the vehicle and the HMD can be communicatively coupled with each other via a wireless connection. In some examples, the processor is a part of an electronic control unit (ECU) associated with the HMD or an ECU associated with the vehicle. In one or more examples, the vehicle can be a motorcycle, a bicycle, or a scooter. In some examples, the HMD can be a helmet or an AR device worn by the rider.

Particular aspects of the subject matter described in this disclosure can be implemented to realize one or more of the following potential advantages. In some examples, the systems and techniques can provide a benefit of enhancing driving safety of motorcycle riders by providing to the riders an AR visualization of the road that can include a recommended speed, or delta to the recommended speed, (e.g., which may be in form of a number overlaid onto an image of the road), recommended leaning angles (e.g., which may be in the form of shapes, such as rectangles, overlaid onto an image of the road), and/or a particular path to drive within the curve (e.g., which may be in the form of a virtual path overlaid onto an image of the road). In some examples, different colors of the shapes (e.g., the rectangles) and/or different spacings between the shapes (e.g., the rectangles) can be used to indicate to the rider whether to speed up or slow down the motorcycle. In one or more examples, the rider's helmet can be used for both driving education (e.g., simulated motorcycle driving scenarios including simulation of the rider driving the motorcycle through virtual curves in roads) and/or real life motorcycle driving scenarios (e.g., real life driving by the rider of the motorcycle through curves in roads) for enhancing the driving safety of a rider (e.g., which may be an inexperienced rider learning to ride a motorcycle). In some examples, the rider's helmet can also be useful for experienced riders when driving motorcycles through curves on roads for the first time such that the riders can be guided to drive as fast as possible through the curves, while still maintaining a reasonable level of driving safety.

Additional aspects of the present disclosure are described in more detail below.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photo-diodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a compli-mentary metal-oxide semiconductor (CMOS), an N-type metal-oxide semiconductor (NMOS), a hybrid CCD/CMOS sensor (e.g., sCMOS), or some other combination thereof.

Figure 13:
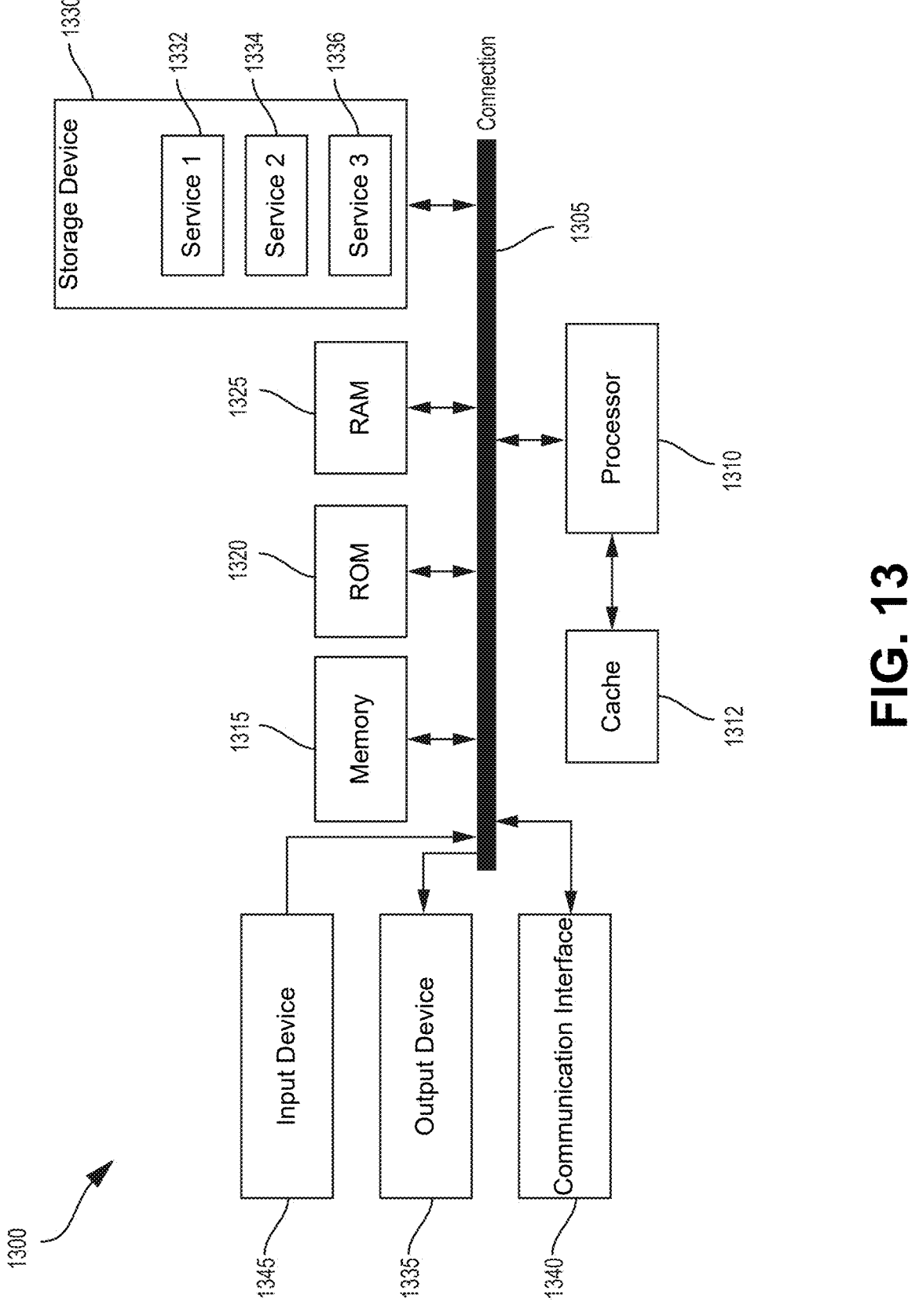
FIG. 13 is a diagram illustrating an example of a system for implementing certain aspects described herein.

The image processor 150 may include one or more processors, such as one or more image signal processors (ISPs) (including ISP 154), one or more host processors (including host processor 152), and/or one or more of any other type of processor 1310 discussed with respect to the computing system 1300 of FIG. 13. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), electronic control units (ECUs), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, fea-ture recognition, receipt of inputs, managing outputs, man-aging memory, or some combination thereof. The image processor 150 may store image frames and/or processed images in random access memory (RAM) 140/1325, read-only memory (ROM) 145/1320, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combina-tion thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing sys-tem 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless con-nectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some imple-mentations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, ECUs, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
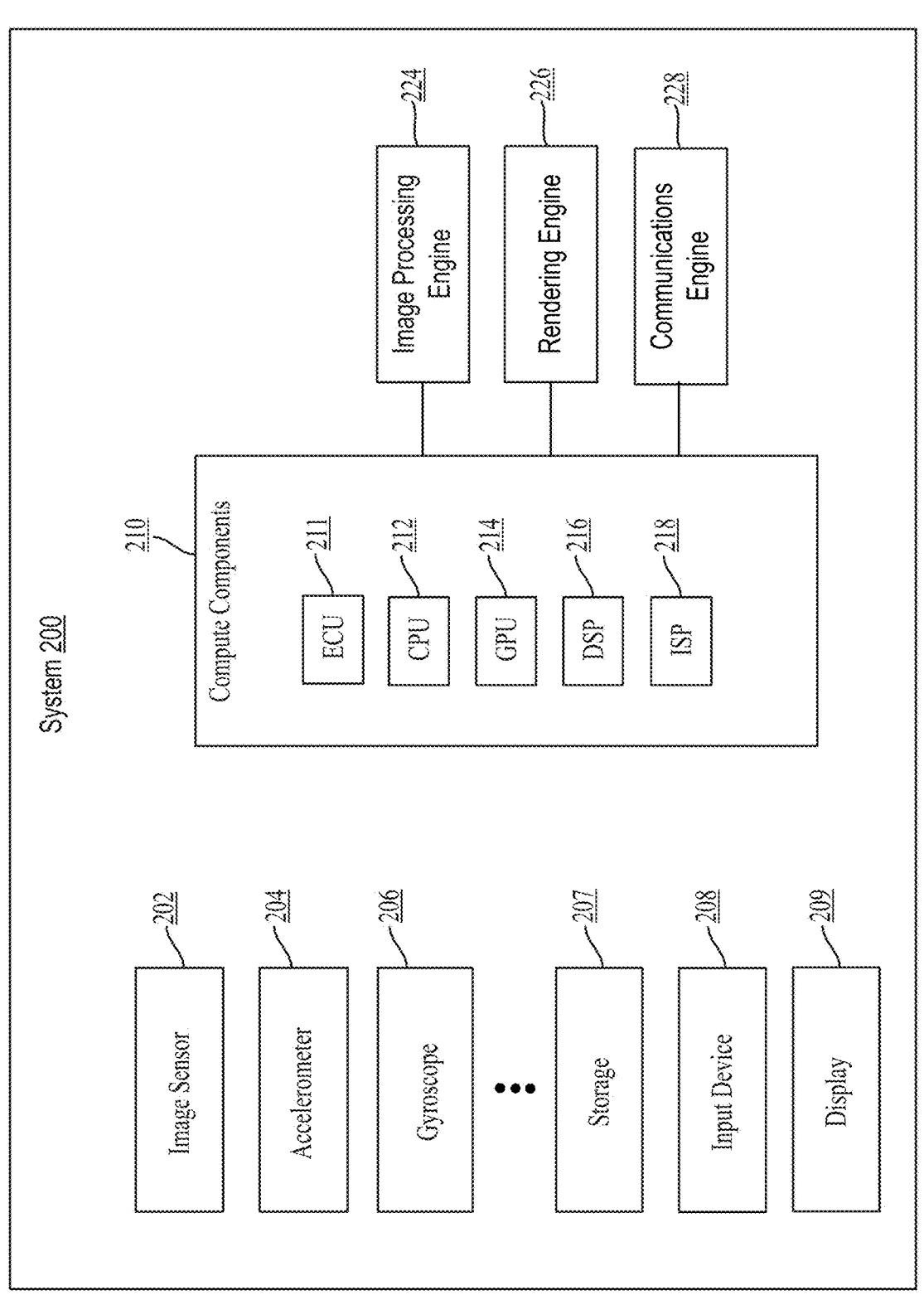
FIG. 2 is a diagram illustrating an architecture of an example system, in accordance with some aspects of the disclosure.

In some examples, the system 200 of FIG. 2 can include the image capture and processing system 100, the image capture device 105A, the image processing device 105B, or a combination thereof.

FIG. 2 is a diagram illustrating an architecture of an example system 200, in accordance with some aspects of the disclosure. The system 200 can run (or execute) applications and implement operations. In some examples, the system 200 can perform tracking and localization, and/or mapping of an environment in the physical world (e.g., a scene). For example, the system 200 can generate a map (e.g., a 3D map) of an environment in the physical world, and display the map on the display 209. The display 209 can include a glass, a screen, a lens, a projector, and/or other display mechanism.

In this illustrative example, the system 200 includes one or more image sensors 202 (e.g., cameras), an accelerometer 204, a gyroscope 206, storage 207, compute components 210, an engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the system 200 can include one or more other sensors (e.g., one or more inertial measurement units (IMUs), RADARs, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2. While various components of the system 200, such as the image sensor 202, may be referenced in the singular form herein, it should be understood that the system 200 may include multiple of any component discussed herein (e.g., multiple image sensors 202).

The system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1345 discussed herein, or any combination thereof. In some cases, the image sensor 202 can capture images that can be processed for interpreting gesture commands.

The system 200 can also communicate with one or more other electronic devices (wired or wirelessly). For example, communications engine 228 can be configured to manage connections and communicate with one or more electronic devices. In some cases, the communications engine 228 can correspond to the communications interface 1340 of FIG. 13.

In some implementations, the one or more image sensors 202, the accelerometer 204, the gyroscope 206, storage 207, compute components 210, engine 220, image processing engine 224, and rendering engine 226 can be part of the same computing device. For example, in some cases, the one or more image sensors 202, the accelerometer 204, the gyroscope 206, storage 207, compute components 210, engine 220, image processing engine 224, and rendering engine 226 can be integrated into a vehicle, an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, application data, face recognition data, occlusion data, etc.), data from the engine 220, data from the image processing engine 224, and/or data from the rendering engine 226 (e.g., output frames). In some examples, the storage 207 can include a buffer for storing frames for processing by the compute components 210.

The one or more compute components 210 can include an electronic control unit (ECU) 211, a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the system 200) can be configured to also capture depth information. For example, in some implementations, the image sensor 202 (and/or other camera) can include an RGB-depth (RGB-D) camera. In some cases, the system 200 can include one or more depth sensors (not shown) that are separate from the image sensor 202 (and/or other camera)

and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the system 200 and can generate acceleration measurements based on the detected acceleration. In some cases, the accelerometer 204 can provide one or more translational vectors (e.g., up/down, left/right, forward/back) that can be used for determining a position or pose of the system 200. The gyroscope 206 can detect and measure the orientation and angular velocity of the system 200. For example, the gyroscope 206 can be used to measure the pitch, roll, and yaw of the system 200. In some cases, the gyroscope 206 can provide one or more rotational vectors (e.g., pitch, yaw, roll). In some examples, the image sensor 202 and/or the engine 220 can use measurements obtained by the accelerometer 204 (e.g., one or more translational vectors) and/or the gyroscope 206 (e.g., one or more rotational vectors) to calculate the pose of the system 200. As previously noted, in other examples, the system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the system 200, using a combination of one or more accelerometers, one or more gyroscopes, and/or one or more magnetometers. In some examples, the one or more sensors can output measured information associated with the capture of an image captured by the image sensor 202 (and/or other camera of the system 200) and/or depth information obtained using one or more depth sensors of the system 200.

The output of one or more sensors (e.g., the accelerometer 204, the gyroscope 206, one or more IMUs, and/or other sensors) can be used by the engine 220 to determine a pose of the system 200 and/or the pose of the image sensor 202 (or other camera of the system 200). In some cases, the pose of the system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g., roll, pitch, and yaw relative to the same frame of reference). In some implementations, the camera pose can be determined for 3-Degrees Of Freedom (3DoF), which refers to the three angular components (e.g., roll, pitch, and yaw).

In some cases, a device tracker (not shown) can use the measurements from the one or more sensors and image data from the image sensor 202 to track a pose (e.g., a 6DoF pose) of the system 200. For example, the device tracker can fuse visual data (e.g., using a visual tracking solution) from the image data with inertial data from the measurements to determine a position and motion of the system 200 relative to the physical world (e.g., the scene) and a map of the physical world. As described below, in some examples, when tracking the pose of the system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the system 200 within the scene and the 3D map of the scene, etc. The 3D map can provide a digital representation of a scene in the real/physical world. In some examples, the 3D map can anchor location-based objects and/or content to real-world coordinates and/or objects. The system 200 can use a mapped scene (e.g., a scene in the physical world represented by, and/or associated with, a 3D map) to merge virtual content or objects with the physical environment.

In some aspects, the pose of image sensor 202 and/or the system 200 as a whole can be determined and/or tracked by the compute components 210 using a visual tracking solution based on images captured by the image sensor 202 (and/or other camera of the system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system. SLAM refers to a class of techniques where a map of an environment (e.g., a map of an environment being modeled by system 200) is created while simultaneously tracking the pose of a camera (e.g., image sensor 202) and/or the system 200 relative to that map. The map can be referred to as a SLAM map, and can be three-dimensional (3D). The SLAM techniques can be performed using color or grayscale image data captured by the image sensor 202 (and/or other camera of the system 200), and can be used to generate estimates of 6DoF pose measurements of the image sensor 202 and/or the system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As previously mentioned, increasingly, systems and devices (e.g., autonomous vehicles, such as autonomous and semi-autonomous cars, motorcycles, drones, mobile robots, mobile devices, XR devices, and other suitable systems or devices) include multiple sensors to gather information about the environment, and processing systems to process the information gathered (e.g., for route planning, navigation, collision avoidance, etc.). Examples of such systems is an ADAS for a vehicle, an ARAS for powered two-wheeled vehicles (e.g., motorcycles, scooters, or other two-wheeled vehicles), etc. Sensor data, such as images, captured from one or more image sensors of cameras and/or radar data captured from one or more radar sensors, may be gathered, transformed, and analyzed for enhancing driving safety.

When riding a motorcycle, many riders (e.g., users) experience collisions due to driving at an incorrect speed when entering a curve, or due to leaning the motorcycle the wrong way and/or at an incorrect angle. As noted previously, current systems do not use information of the vehicle (e.g., motorcycle information) and environmental/contextual information (e.g., map information) to enhance the capabilities of the rider for driving safety. Therefore, improved systems and techniques that enhance the capabilities of riders of motorcycles for driving safety can be useful.

In one or more aspects, the systems and techniques provide solutions for guiding motorcycles into a curve using helmet AR.

Various aspects relate generally to driving assistance. Some aspects more specifically relate to systems and techniques that provide solutions for guiding riders to ride motorcycles in a safer way by providing to the riders recommended leaning angles, speeds, and/or paths for known as well as unknown curves in roads. In one or more aspects, an AR display on a motorcycle rider's helmet may display guidance related to a recommended lean angle, speed, and/or path when driving through a curve in a road. This guidance may be based on data collected from sensors implemented within the helmet, sensors implemented within the motorcycle, maps, and/or road condition data.

In one or more aspects, for a motorcycle being driven at a high speed when entering a curve in a road, an HMD (e.g., a helmet HMD, which may include a helmet visor configured to display AR content) of the rider may display AR guidance on how much and when the rider should lean, based on the curve radius, road conditions, traffic conditions, the motorcycle speed, crowdsourced data (e.g., data indicating how other riders of vehicles, such as motorcycles, performed on the particular curve). For example, optimal guidance information (e.g., leaning information indicating how much and when to lean, motorcycle speed, etc.) can be determined based on data obtained (e.g., based on real-time or near-real-time observations) after successful curve maneuver(s) by one or more other vehicles (e.g., motorcycles, scooters, etc.). In some cases, such data obtained by a vehicle (e.g., motorcycle) after a successful maneuver can be used as feedback for the rider of the vehicle and/or as crowdsourced data for riders of other vehicles. For example, the feedback can be shared with the rider of the vehicle that performed successful maneuver (e.g., indicating how well the rider maneuvered the curve after the maneuver is completed). Additionally or alternatively, the data can be shared (e.g., as crowdsourced data) with rider(s) of one or more other vehicles prior to the other vehicle(s) entering the curve. For instance, the crowdsourced data can be shared as a learned map with a fleet of riders. The crowdsourced data can be saved and used by a rider's vehicle (e.g., a motorcycle) to determine AR guidance for future upcoming curves (e.g., as feedback indicating "this is how other riders have handled the upcoming curve").

The AR guidance may also indicate to the rider whether to speed up or slow down, and where within the road to do so. In one or more examples, when the rider's eye gaze and/or helmet pose is not pointed in a direction of a curve in the road that lies ahead, the AR guidance may provide the guidance information to the rider prior to the motorcycle entering the curve such that the rider has sufficient enough time to adapt (e.g., adjust his eye gaze and/or head pose in the direction of the upcoming curve). In some examples, a gyroscope may be employed (e.g., implemented within the motorcycle and/or the rider's helmet) to maintain a stable visualization of the road on the display of the rider's helmet. In one or more examples, a coarse localization for the motorcycle may be determined based on map data, GPS data, camera sensor data, and/or radar sensor data. In some examples, various factors can be considered to determine whether to indicate a more conservative speed and/or amount of lean. For instance, when the road has a large amount of friction, a slippery surface, and/or objects (e.g., obstacles, oncoming traffic, etc.) close to the curve, the AR guidance may indicate to the rider a more conservative speed and leaning approach. In some examples, when GPS data is not available, a location of the motorcycle may be determined by using sensor data obtained by sensors implemented within the motorcycle and/or the rider's helmet. In one or more examples, collective and individual maps using feedback from the rider to indicate when they are starting to turn the motorcycle into a curve may be used to customize how early or late AR guidance prompts need to be given to the rider, based on the rider's (and in some cases one or more other riders') previous driving experience on the same or similar roads.

In one or more aspects, the systems and techniques connect the rider's helmet to the motorcycle as well as to camera sensor data and/or map data for estimating radii of a curve in a road. The systems and techniques provide driving guidance data to the rider in the form of a display, within an HMD of the rider, displaying to the rider a recommended speed, recommended leaning angles, and/or a recommended path to use when driving through the curve in the road.

Figure 3:
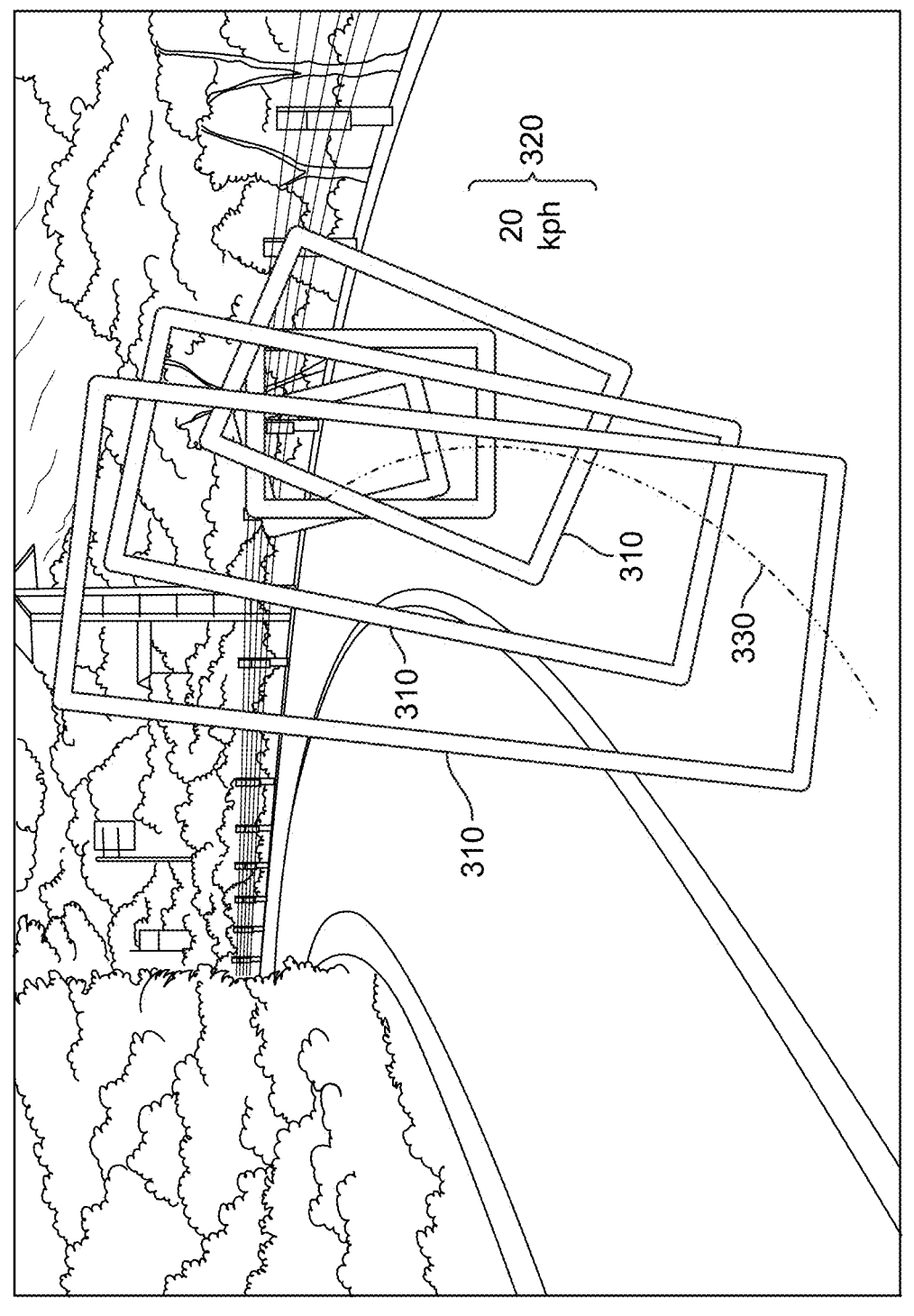
FIG. 3 is a diagram illustrating an example of driving guidance data for a rider of a vehicle including an image of a curve of a road with a speed limit number, virtual shapes, and a virtual path overlaid onto the image, in accordance with some aspects of the disclosure.

FIG. 3 shows an example of a display of guiding driving data. In one or more examples, a display (e.g., AR display) within an HMD (e.g., helmet or AR glasses) associated with (e.g., worn by) the rider can display the guiding driving data to the rider (e.g., as shown in the example of FIG. 3). In particular, FIG. 3 is a diagram illustrating an example of driving guidance data including an image 300 of a curve of a road with a speed limit number, virtual shapes, and a virtual path overlaid onto the image. In FIG. 3, the image is shown to include a curve in a road. The driving guidance data can include recommended lean angles for the rider, a recommended speed for the vehicle (e.g., motorcycle, bicycle, or scooter), and/or a recommended path for the rider to drive the vehicle within curve in the road (e.g., to avoid a pothole, ice, or snow in the road). In FIG. 3, shapes 310 (e.g., in the form of rectangles) are shown to be overlaid on the image 300 spanning along the curve in the road to each indicate to the rider a recommended leaning angle to lean to while driving at that position in the curve. In one or more examples, the shapes may be of various different forms (e.g., ovals, squares, etc.) than the rectangular forms as shown in FIG. 3. FIG. 3 also shows a number 320 (e.g., 20 kilometers per hour (kph)) overlaid on the image 300 to indicate to the rider a recommended speed to drive the vehicle through the curve in the road. In FIG. 3, a virtual path 330 is overlaid on the image 300 to indicate to the rider a recommended path to drive the vehicle (e.g., motorcycle, bicycle, or scooter) through the curve in the road.

Figure 4:
FIG. 4 is a diagram illustrating an example of a poly-line that is representative of a curve in a road, in accordance with some aspects of the disclosure.

In one or more aspects, the systems and techniques can determine the driving guidance data (e.g., the recommended speed, leaning angles, and/or path for the rider) based on using a poly-line to represent the curve in the road. FIG. 4 shows an example of a poly-line used to represent a curve in a road. In particular, FIG. 4 is a diagram illustrating an example 400 of a poly-line 410 that is representative of a curve in a road.

In one or more examples, the poly-line 410 can be modeled to have a shape similar to a shape of the curve of the road. The poly-line 410 can include a plurality of points (e.g., points 410*a*-*g*). The poly-line 410 (e.g., and the plurality of points 410*a*-*g*) span the length of the curve of the road.

The poly-line, based on the representation of the curve, can include a number of different radii (e.g., radius r1, radius r2, radius r3). The poly-line can be divided into sections (e.g., an entering curve-phase section 430*a*, an inside curve-phase section 430*b*, and an out of curve-phase section 430*c*) based on the different radii, such that each section has a respective radii. As such, the entering curve-phase section 430*a* has the radius r1 (e.g., and the points 420*a*, 420*b*, 420*c*), the inside curve-phase section 430*b* has the radius r2 (e.g., and the points 420*d*, 420*c*), and the out of curve-phase section 430*c* has the radius r3 (e.g., and the points 420*f*, 420*g*).

In one or more examples, to determine the driving guidance data, for each point 420*a-g* in the poly-line 410, a processor (e.g., within an ECU) can calculate a recommended (e.g., conservative) leaning angle for the vehicle (e.g., motorcycle, bicycle, or scooter), a recommended (e.g., conservative) speed for the rider to drive the vehicle through the curve, and/or a recommended path for the rider to drive the vehicle through the curve. In one or more examples, a conservative speed recommendation is within a bottom twenty-five person of the recommended range of speed for the vehicle. Based on an individual rider (e.g., individual rider characteristics, for example whether a rider is experienced or inexperienced), for each curve radius (e.g., radius r1, radius r2, and radius r3), for each curve radius, the processor can calculate a final recommended speed, leaning angle, and path for the rider to drive the vehicle through curve in the road.

In one or more aspects, the HMD (e.g., helmet or AR glasses) associated with (worn by) the rider and the vehicle (e.g., motorcycle, bicycle, or scooter) are communicatively connected to each other via wireless communications (e.g., Wi-Fi, cloud connectivity, and/or Bluetooth) such that both the HMD and the vehicle are aware of each other's orientation, and can communicate (e.g., transmit) communication data to each other back and forth. In some aspects, the HMD of the rider and the vehicle may both have gyroscopes to understand the direction of travel of the vehicle as well as the up and down directions with respect to the leaning angle of the rider. In one or more examples, the HMD of the rider may have front and rear camera sensors as well as one or more radar sensors for sensing the environment as well as for performing rider eye tracking for rider state determination (e.g., to determine whether the rider is inattentive based on the rider's eye gaze). In some examples, the vehicle may have surround vision (e.g., camera sensors mounted around the exterior of the vehicle) as well as radar sensors (e.g., which may be mounted at the front and the rear of the vehicle). As such, the rider's HMD and vehicle (e.g., motorcycle, bicycle, or scooter) may have a plurality of various different features and capabilities.

Figure 5:
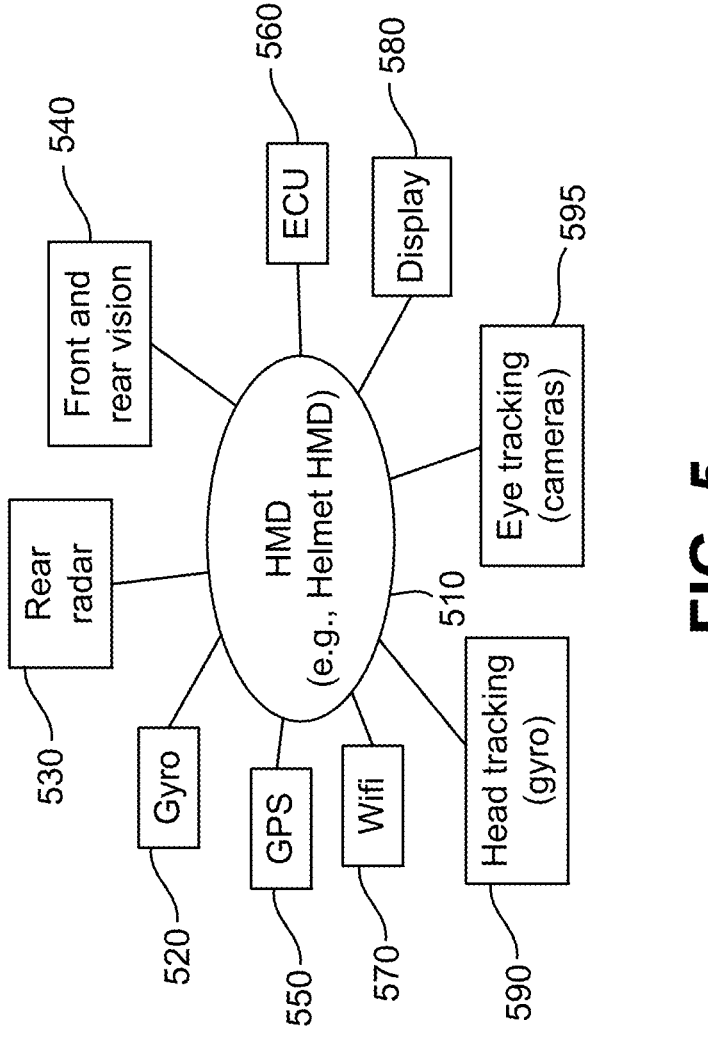
FIG. 5 is a diagram illustrating an example of a rider's head-mounted device (HMD) (e.g., a helmet HMD of a rider of a motorcycle) including a plurality of features, in accordance with some aspects of the disclosure.
Figure 6:
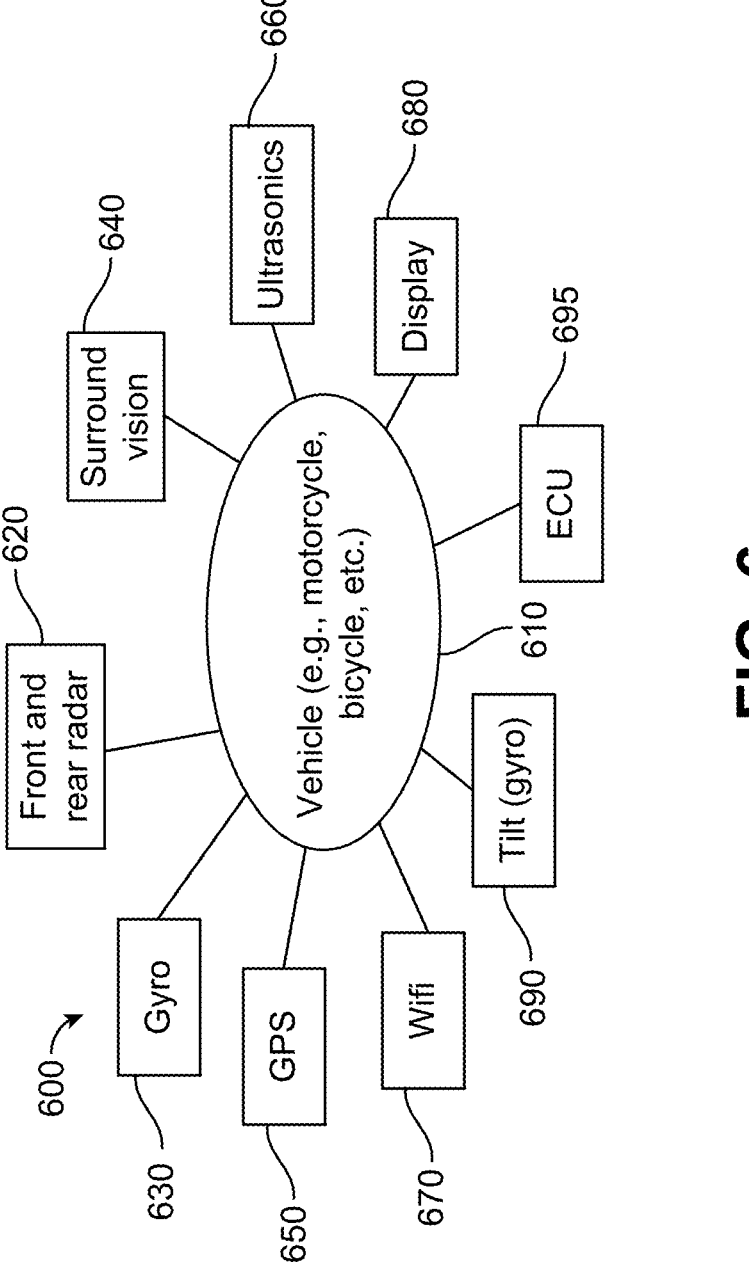
FIG. 6 is a diagram illustrating an example of a vehicle including a plurality of features, in accordance with some aspects of the disclosure.

FIGS. 5 and 6 show examples of features that an HMD (e.g., helmet) of a rider and a vehicle (e.g., motorcycle, bicycle, or scooter) may employ, respectively. In particular, FIG. 5 is a diagram illustrating an example 500 of a rider's HMD 510 (e.g., helmet or AR glasses) including a plurality of features. In FIG. 5, the HMD 510 is shown to include a gyroscope (gyro) 520, a rear radar sensor 530, front and rear vision 540 (e.g., front and rear camera sensors), GPS 550 (e.g., a GPS receiver), an ECU 560, Wi-Fi capability 570, a display 580 (e.g., an AR display), a head tracking gyro 590, and eye tracking camera sensors 595. In one or more examples, the HMD 510 may include more or less features than the features shown in FIG. 5. In some examples, the HMD 510 may include different features than the features shown in FIG. 5.

FIG. 6 is a diagram illustrating an example 600 of a vehicle 610 (e.g., a motorcycle, a bicycle, or a scooter) including a plurality of features. In FIG. 6, the vehicle is shown to include front and rear radar sensors 620, a gyro 630, surround vision 640 (e.g., surrounding camera sensors), GPS 650 (e.g., a GPS sensor), ultrasonics 660 (e.g., ultrasonic sensors to sense friction in the road), Wi-Fi capability 670, a display 680 (e.g., an AR display), a tilt gyro 690 (e.g., to determine a leaning angle of the vehicle), and an ECU 695. In one or more examples, the vehicle 610 may include more or less features than the features shown in FIG. 6. In some examples, the vehicle 610 may include different features than the features shown in FIG. 6.

In one or more aspects, the determination (e.g., calculation) of the driving guidance data (e.g., how to move in the curve) may be performed by an ECU in the vehicle (e.g., motorcycle, bicycle, or scooter) or in an ECU in the rider's HMD (e.g., helmet or AR glasses). In some examples, the ECU can incorporate a poly-line with a suggested speed, suggested path, and/or a suggested associated leaning angle for the vehicle.

In one or more aspects, rider head pose and/or rider eye tracking can be used for displaying driving guidance data. In one or more examples, if the rider's HMD does not have a rider eye tracking capability, a gyro in the HMD can be used to determine the rider's head position. A processor of the ECU can then compare the rider's head position with the vehicle's gyro data. The processor can plot the leaning angle guidance and curve positioning (e.g., path based on a poly-line model), based on the comparision.

In some examples, if the rider's HMD does not have a rider eye tracking capability, a camera sensor on the vehicle pointed towards the rider can be used to determine an approximate head position of the rider. The processor can compare the head position of the rider to an origin (e.g., a center point) of the vehicle. The processor can plot the leaning angle guidance and curve positioning (e.g., path based on a poly-line model), based on the comparision.

In one or more aspects, a front camera sensor on a rider's HMD can be used for perception processing and sensor fusion of a curve model (e.g., a first poly-line) with a model (e.g., a second poly-line) from a front camera sensor of the vehicle. The information can then be combined to determine (e.g., by the processor of an ECU) and display (e.g., by an AR display) a refined location of the curve (e.g., a path based on a the combined poly-lines) to the rider.

In one or more examples, a camera sensor on a rider's HMD can be used for obtaining all of the sensing data to obtain an approximation of the curve, regardless of rider head movement. In one or more examples, the road model (e.g., a poly-line) can be assumed to always be flat. The road model can be set as "down" in the gyro (e.g., meaning the road is set to be located at the bottom for the gyro). The leaning angle guidance can be displayed related to the road model set as "down" (e.g., not in relation to "down" on the HMD).

Figure 7:
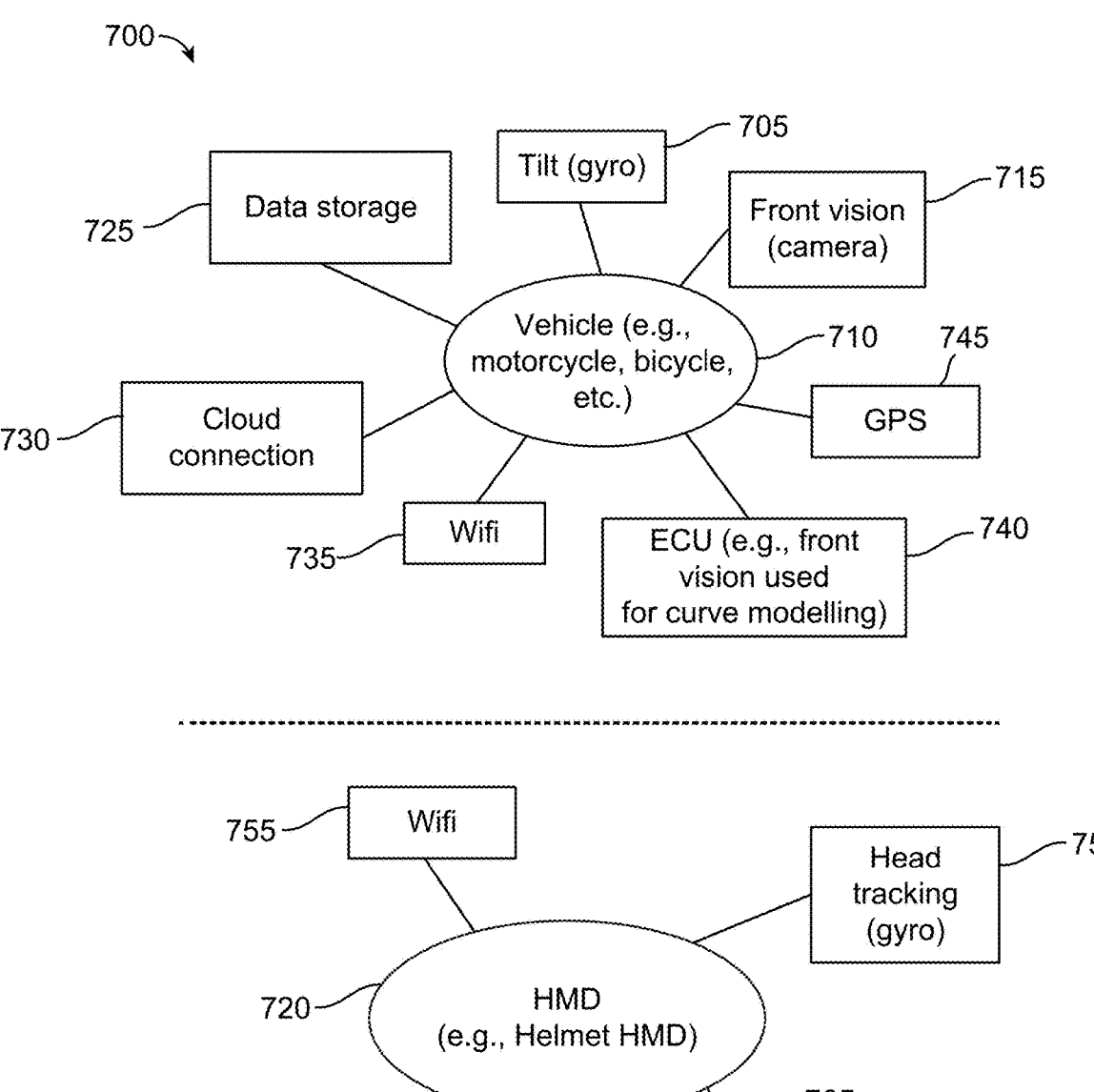
FIG. 7 is a diagram illustrating a first example of a configuration of a rider's HMD and vehicle for a no eye-tracking solution for guiding the vehicle through a curve in a road, in accordance with some aspects of the disclosure.

FIGS. 7, 8, 9, and 10 show examples (e.g., a first example, second example, third example, and fourth example, respectively) of different configurations of a rider's HMD and vehicle for a no eye-tracking solution for guiding the vehicle through a curve in a road. In particular, FIG. 7 is a diagram illustrating a first example 700 of a configuration of a rider's HMD 720 (e.g., helmet) and vehicle 710 (e.g., motorcycle) for a no eye-tracking solution for guiding the vehicle through a curve in a road. In FIG. 7, the vehicle 710 is shown to include a number of different features including tilt (gyro) 705, front vision 715 (e.g., front camera sensor), data storage 725 and/or cloud connection 730, Wi-Fi capability 735, an ECU 740 (e.g., for processing front vision for curve modeling), and GPS 745 (e.g., optional). The rider's HMD 720 is shown to include a number of different features including a head tracking gyro 750, Wi-Fi capability 755, an ECU 760, and a head-up display (HUD) 765.

Figure 8:
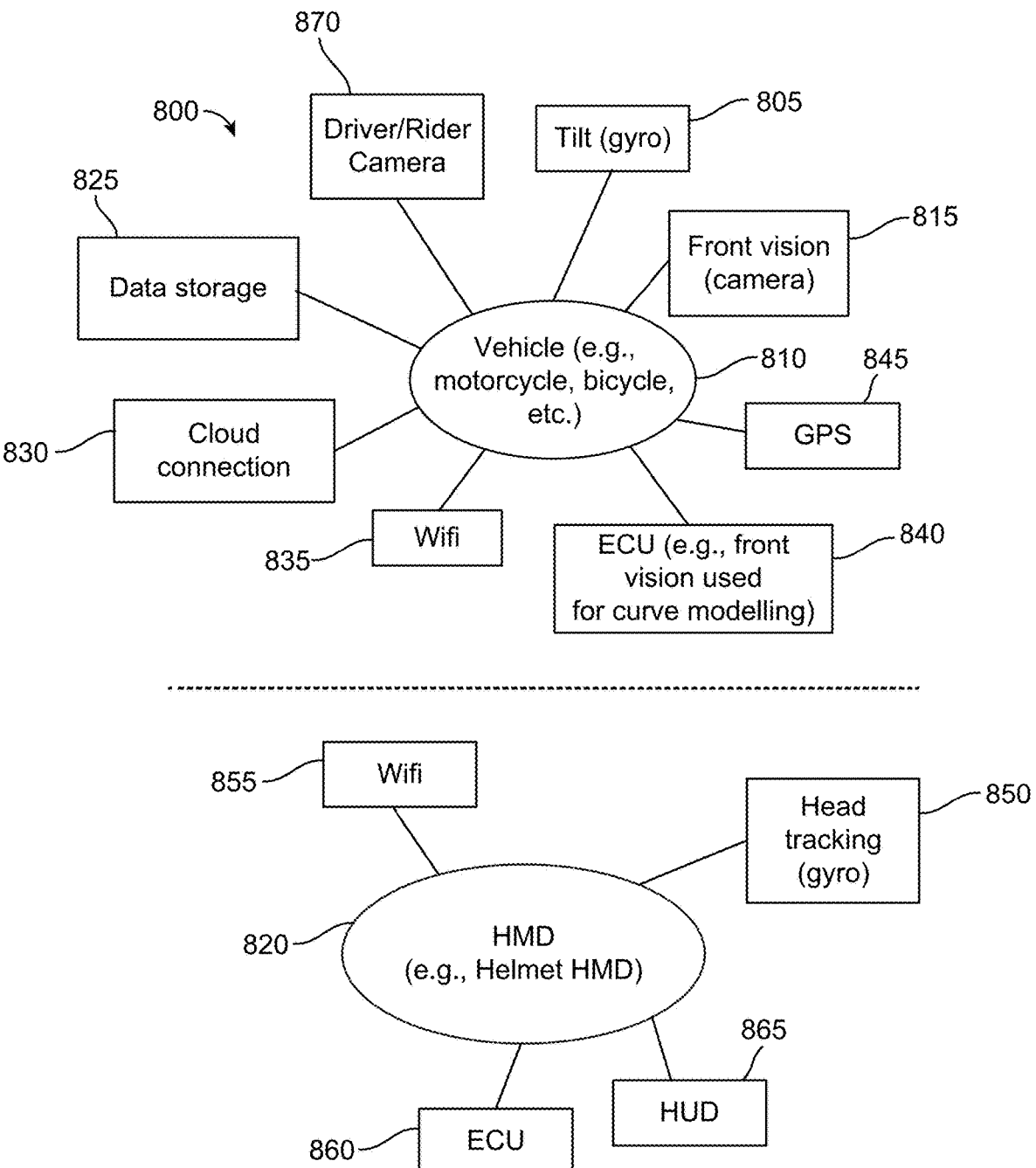
FIG. 8 is a diagram illustrating a second example of a configuration of a rider's HMD and vehicle for a no eye-tracking solution for guiding the vehicle through a curve in a road, in accordance with some aspects of the disclosure.

FIG. 8 is a diagram illustrating a second example 800 of a configuration of a rider's HMD 820 (e.g., helmet) and vehicle 810 (e.g., motorcycle) for a no eye-tracking solution for guiding the vehicle through a curve in a road. In FIG. 8, the vehicle 810 is shown to include a number of different features including tilt (gyro) 805, front vision 815 (e.g., front camera sensor), data storage 825 and/or cloud connection 830, Wi-Fi capability 835, an ECU 840 (e.g., for processing front vision for curve modeling), GPS 845 (e.g., optional), and a driver camera 870. The rider's HMD 820 is shown to include a number of different features including a head tracking gyro 850, Wi-Fi capability 855, an ECU 860, and an HUD 865.

Figure 9:
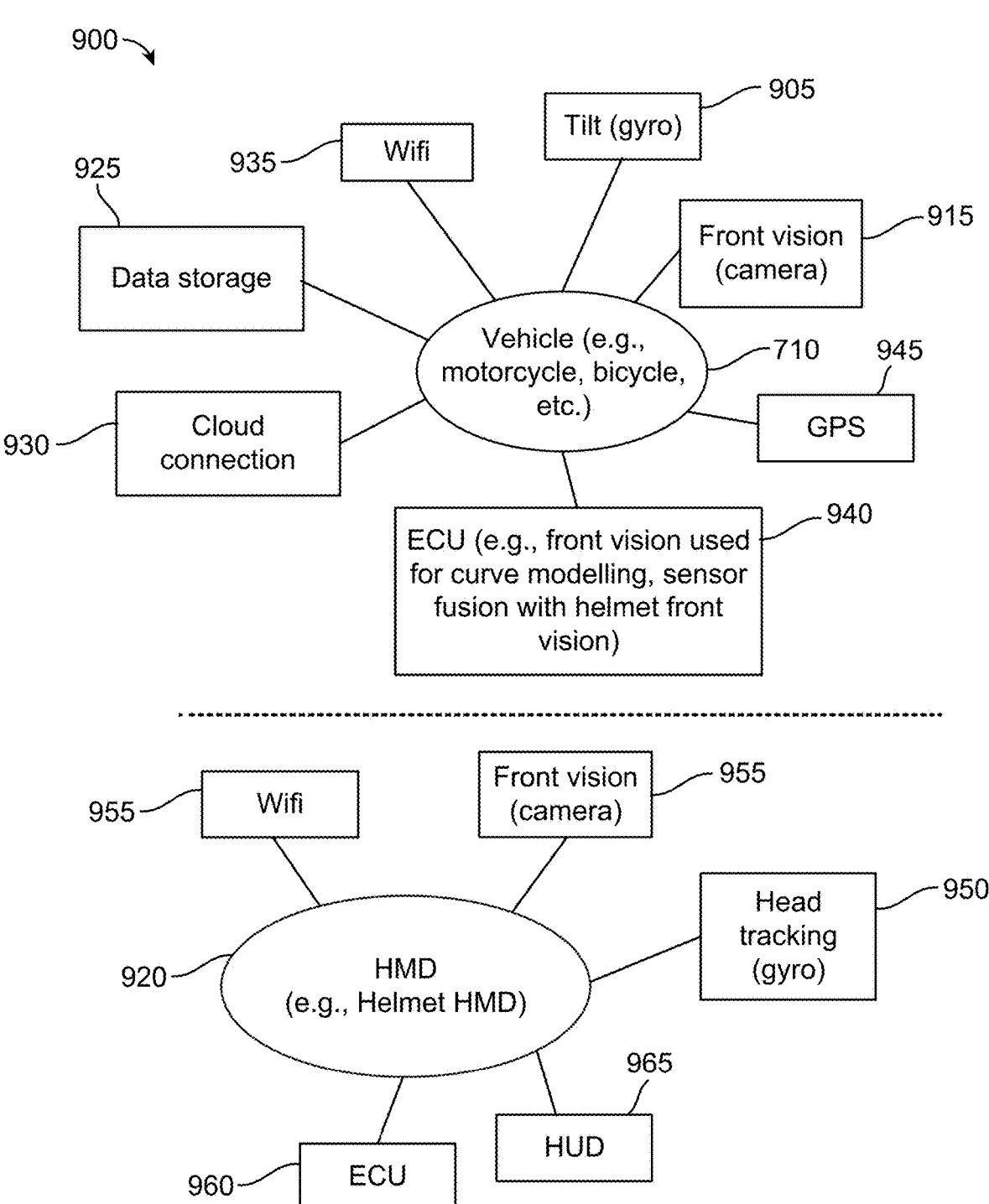
FIG. 9 is a diagram illustrating a third example of a configuration of a rider's HMD and vehicle for a no eye-tracking solution for guiding the vehicle through a curve in a road, in accordance with some aspects of the disclosure.

FIG. 9 is a diagram illustrating a third example 900 of a configuration of a rider's HMD 920 (e.g., helmet) and vehicle 910 (e.g., motorcycle) for a no eye-tracking solution for guiding the vehicle through a curve in a road. In FIG. 9, the vehicle 910 is shown to include a number of different features including tilt (gyro) 905, front vision 915 (e.g., front camera sensor), data storage 925 and/or cloud connection 930, Wi-Fi capability 935, an ECU 940 (e.g., for processing front vision for curve modeling and for performing sensor fusion with the HMD front vision), and GPS 945 (e.g., optional). The rider's HMD 920 is shown to include a number of different features including a head tracking gyro 950, Wi-Fi capability 955, an ECU 960, an HUD 865, and front vision 970 (e.g., front camera sensors).

FIG. 10 is a diagram illustrating a fourth example 1000 of a configuration of a rider's HMD 1020 (e.g., helmet) and vehicle 1010 (e.g., motorcycle) for a no eye-tracking solution for guiding the vehicle through a curve in a road. In FIG. 10, the vehicle 1010 is shown to be a "dumb" vehicle that does not include any features. The rider's HMD 1020 is shown to include a number of different features including a head tracking gyro 1050, Wi-Fi capability 1055, an ECU 960, an HUD 1065, front vision 1070 (e.g., front camera sensors), data storage 1025 and/or cloud connection 1030, and an ECU 1060 (e.g., for processing the front vision for curve modeling).

In one or more aspects, when a rider's HMD and/or a rider's gaze is determined to not be pointed in a direction of an upcoming curve in the road, the HMD can display (e.g., via the HMD's visor) augmented information regarding the upcoming curve in the road ahead of time (e.g., based on the current vehicle speed, and/or radii of the upcoming curve) based on a map-based localization of the vehicle to prepare the rider of the upcoming task (e.g., driving the curve). Progressive and/or modal alerts (e.g., visual alerts and/or audible alerts) may be presented to the rider in the direction of the current eye gaze of the rider to ensure that the rider's gaze will be properly directed towards the upcoming curve in the road. These alerts can be customized based on what types of alerts have been effective for that specific rider in the past. Once the rider's gaze is confirmed to be directed towards the curve, the driving guidance data (e.g., including the leaning angle) can be displayed (e.g., on the HMD) to the rider.

In some aspects, when a rider's head is tilted, the visualization of the display within the HMD can be kept stable by using a gyro (e.g., within the HMD). The gyro in the HMD can help to independently confirm that the vehicle's odometry matches with the gyro data.

In one or more aspects, a coarse localization (e.g., within one meter) for a vehicle (e.g., driving through a curve) can be determined by using various different types of data. The data may include map data for determining the curve radius and extension (e.g., length), GPS data for determining an approximate position, camera sensor data for determining the curve location and verifying the location by using landmarks, radar data to detect a relative position of surrounding guardrails and for identifying road boundaries and nearby objects based on relative velocity, and GPS data for triggering the display of driving guidance data to the rider when the rider is located at least one-hundred (100) meters prior to the entrance of the curve, when the curve has a radius below N number (e.g., 2) meters. In one or more examples, while the vehicle driving through the curve, a processor (e.g., within an ECU) can perform path planning by calculating a poly-line that represents the curve and by updating the poly-line. The poly-line can then be merged with a corresponding curve in a map. In some examples, a certain number (e.g., X number, such as 100) of points may be implemented within a poly-line that represents a curve in the road, where each point can associated with a certain tilt (e.g., leaning angle) for the rider to use when driving at the location that corresponds to that point in the poly-line.

In one or more aspects, for various hazardous road conditions (e.g., rain, snow, oil slicks, pot holes), a processor (e.g., within an ECU) can evaluate the current rider body posture and/or leaning angle by using gyro data from a gyro within the rider's HMD. The processor can use feedback from vehicle odometry, traction control, braking status, and tire conditions, as well as use confirmation from other architectural elements, such as maps and camera sensor data, to determine whether the curve in the road has a low or high level of friction and determine the vehicle's capability for driving with that level of road friction. The processor can then account for all of this previously mentioned information in the driving planning (e.g., the determination of the driving guidance data) to suggest to the rider a conservative leaning profile (e.g., a leaning angle) and recommend to the rider a speed reduction, if needed to maintain a safe leaning angle when driving through the curve. In one or more examples, the driving guidance data can guide (e.g., nudge) the rider to drive the vehicle over a portion of the curve (e.g., that is dry, and does not have ice) that has suitable friction for enhanced driving safety.

In one or more aspects, when a rider's HMD loses map information and/or GPS data right before entering into a curve, dead reckoning can be performed to determine the location of the vehicle by using vehicle inertial sensors. In some examples, a position estimate of the vehicle can be determined by using the last known position of the vehicle along with the internal odometry of the vehicle. In one or more examples, a processor can determine a road model (e.g., a poly-line) for the curve by using camera sensor data (e.g., obtained from cameras sensors of the HMD and/or vehicle) for recognizing the curve and for verifying the curve by using landmarks. In some examples, a processor can determine a radar road model (e.g., a poly-line) for the curve by using radar data (e.g., obtained from radar sensors of the HMD and/or vehicle) to detect the relative position of surrounding guardrails and identify road boundaries and nearby objects.

In one or more aspects, collective learning from what other riders have done in similar scenarios can be collected via vehicle-to-everything (V2X) signals, and that collected data can then be propagated as additional information for a map (e.g., to create a learned map).

This map (e.g., learned map) would be based on learning on what other riders with a similar ride profile did (e.g., their leaning angle) in that road segment (e.g., and in similar contexts). This learned map can be tuned over time based on aggregated effectiveness of the feedback over time (e.g., post maneuvering a curve) from the rider. Based on this additional information (e.g., learning map), road segments can be visually labeled, such as red to indicate a tight curve, yellow to indicate a moderate curve, and green to indicate a wide curve, based on varying degrees of leaning required ahead of time to help prepare the rider as part of a route preview when entering the destination in navigation. Feedback from rider to indicate when the rider is starting to turn can be used to customize how early or late the prompts (e.g., the display of the driving guidance data) need to be given to the rider, based on the rider's previous experience in same or similar routes. The rider's feedback after driving the curve can also be learned based on the rider's facial expression (e.g., detected using an interior camera within the HMD) right after driving the curve to improve the prompts.

In one or more aspects, a basic solution for determining driving guidance data can use map data along with localization data plus camera sensor data, vehicle speed, and GPS data. A more advanced solution could also take vehicle weight and rider weight into account for the calculations. In some aspects, a basic solution for determining driving guidance data can be HMD only, and use the vehicle speed determined from the GPS receiver in the HMD. The more advanced version could use vehicle speed from the bike, as well as vehicle weight and rider weight, and may also use the vehicle's camera sensor data.

Figure 11:
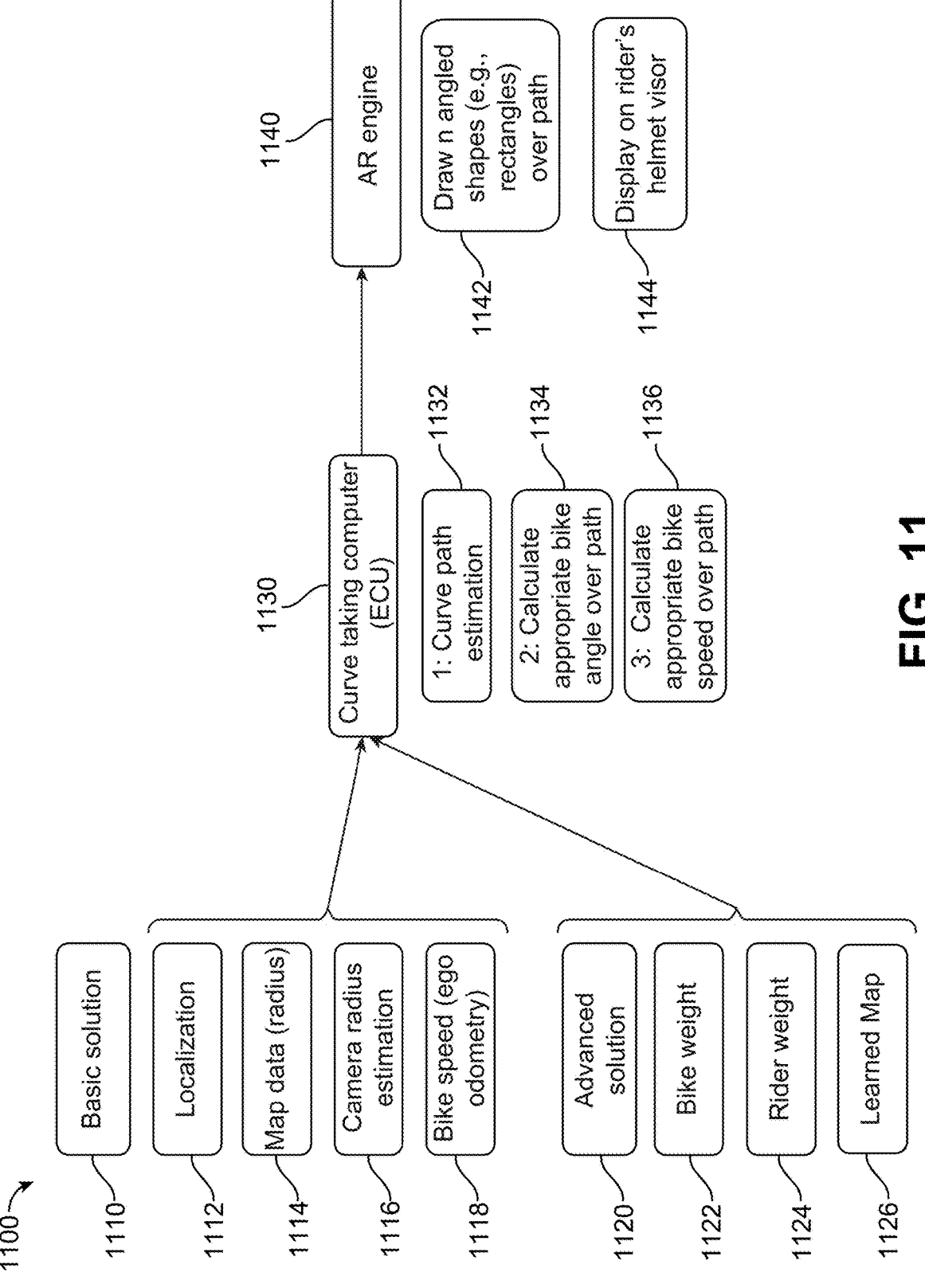
FIG. 11 is a diagram illustrating an example of a process for guiding vehicles into a curve using HMD augmented reality AR, in accordance with some aspects of the disclosure.

FIG. 11 show an example of a process for determining driving guidance data. In particular, FIG. 11 is a diagram illustrating an example of a process 1100 for guiding vehicles (e.g., motorcycles, bicycles, and scooters) into a curve using HMD (e.g., helmet or AR glasses) augmented reality AR.

In one or more examples, during operation of the process 1100 for guiding vehicles (e.g., motorcycles, bicycles, and scooters) into a curve using HMD (e.g., helmet or AR glasses) augmented reality AR, a processor (e.g., within an ECU of the vehicle or HMD) may obtain driving data associated with a vehicle, a rider of the vehicle, and/or an environment of the vehicle while the rider is driving the vehicle on a road. In one or more examples, the driving data may include radar data of the environment of the vehicle, camera image data of the environment of the vehicle, gyroscope data associated with the vehicle, gyroscope data associated with the HMD, GPS data indicating a location of at least one of the vehicle or the HMD, eye tracking camera image data of the rider, odometry data associated with the vehicle, traction data associated with vehicle, weather data associated with the environment of the vehicle, a current leaning angle of the rider, a current braking level associated with the vehicle, a current speed associated with the vehicle, and/or ultrasonic data associated with the vehicle.

In one or more examples, in FIG. 11, driving data for a basic solution 1110 and driving data for an advanced solution 1120 are shown. The driving data for the basic solution 1110 is shown to include localization data 1112, map data (e.g., radius) 1114, camera radius estimation 1116, and vehicle speed (e.g., from vehicle odometry) 1118. The driving data for the advanced solution 1120 is shown to include the vehicle weight 1122, the rider weight 1124, and the learned map 1126.

The processor may determine, based on the driving data (e.g., at the curve taking computer step 1130), driving guidance data for the rider for driving the vehicle through a curve in the road. In one or more examples, determining the driving guidance data may include curve path estimation 1132, calculating an appropriate vehicle angle over the path 1134, and calculating an appropriate vehicle speed over the path 1136.

In one or more examples, determining the driving guidance data may include determining initial driving guidance data for each point of a plurality of points of a poly-line representing the curve in the road. In some examples, the plurality of points may span a length of the curve in the road. In one or more examples, determining the driving guidance data may further include determining, based on the initial driving guidance data for each point of the plurality of points of the poly-line, final driving guidance data for each radius of a plurality of radii of the poly-line representing the curve in the road. In some examples, each radius of the plurality of radii may include a respective portion of points of the plurality of points. In one or more examples, the driving guidance data may include a recommended lean angle for the rider (e.g., an appropriate vehicle angle over the path determined from calculating an appropriate vehicle angle over the path 1134), a recommended speed for the vehicle (e.g., an appropriate vehicle speed over the path determined from calculating an appropriate vehicle speed over the path 1136, and/or a recommended path to drive the vehicle within the curve in the road (e.g., an estimated curve path determined from curve path estimation 1132).

A display (e.g., an AR display with an AR engine 1140), of a HMD associated with the rider (e.g., an HMD worn by a rider), may display the driving guidance data. In one or more examples, the driving guidance data may be displayed on the rider's HMD visor 1144. In some examples, the driving guidance data may include a recommended lean angle for the rider. The driving guidance data may include a shape (e.g., a rectangle) overlaid on an image of the road to indicate the recommended lean angle for the rider. In some examples, n angled rectangles may be on the path overlaid on the image 1142.

In one or more examples, the driving guidance data may include a recommended speed for the vehicle. The driving guidance data may include a number overlaid on the image of the road to indicate the recommended speed for the vehicle. In some examples, the driving guidance data may include a recommended path to drive the vehicle within the curve in the road. The driving guidance data may include a virtual path overlaid on the image of the road to indicate the recommended path.

In some examples, the driving data may include eye tracking camera image data of the rider. For these examples, the processor may determine, based on the eye tracking camera image data of the rider, that the rider is inattentive to the curve in the road. The processor may, based on determining the rider being inattentive to (e.g., not looking towards) the curve in the road, output an alert to the rider via the HMD. In some examples, the alert may be a visual alert displayed on the display of the HMD and/or an audible alert output via a speaker of the HMD.

In one or more examples, the vehicle and the HMD may be communicatively coupled with each other via a wireless connection. In some examples, the processor is a part of an ECU associated with the HMD or an ECU associated with the vehicle. In one or more examples, the vehicle may be a motorcycle, a bicycle, or a scooter. In some examples, the HMD may be a helmet or an AR device worn by the rider.

FIG. 12 is a flow chart illustrating an example of a process 1200 for driving assistance. The process 1200 can be performed by a computing device (e.g., system 200 of FIG. 2 and/or a computing device or computing system 1300 of FIG. 13) or by a component or system (e.g., a chipset, one or more processors, one or more electronic control units (ECUs) (e.g., ECU 211 of FIG. 2), central processing units (CPUs), digital signal processors (DSPs), graphics processing units (GPUs), any combination thereof, and/or other type of processor(s), or other component or system) of the computing device. The operations of the process 1200 may be implemented as software components that are executed and run on one or more processors (e.g., processor 1310 of FIG. 13 or other processor(s)). Further, the transmission and reception of signals by the computing device in the process 1200 may be enabled, for example, by one or more antennas and/or one or more transceivers (e.g., wireless transceiver (s)).

At block 1210, the computing device (or component thereof, such as at least one processor) can obtain driving data associated with a vehicle, a rider of the vehicle, and/or an environment of the vehicle while the rider is driving the vehicle on a road. For example, the vehicle can be a motorcycle, a bicycle, a scooter, or other vehicle. In some aspects, the driving data includes radar data of the environment of the vehicle (e.g., obtained from one or more radar sensors of the vehicle and/or of a head-mounted device (HMD) of the rider), camera image data of the environment of the vehicle (e.g., obtained from one or more camera sensors of the vehicle and/or of the HMD of the rider), gyroscope data associated with the vehicle (e.g., obtained from one or more IMUs and/or other sensors of the vehicle), gyroscope data associated with the HMD (e.g., obtained from one or more IMUs and/or other sensors of the HMD of the rider), Global Positioning System (GPS) data (or Global Navigation Satellite System (GNSS) data) indicating a location of at least one of the vehicle or the HMD (e.g., obtained from one or more GPS and/or GNSS receivers/sensors of the vehicle and/or of the HMD of the rider), eye tracking camera image data of the rider (e.g., obtained from one or more eye tracking camera sensors of the HMD of the rider), odometry data associated with the vehicle, traction data associated with vehicle, weather data associated with the environment of the vehicle, a current leaning angle of the rider, a current braking level associated with the vehicle, a current speed associated with the vehicle, ultrasonic data associated with the vehicle, any combination thereof, and/or other driving data. In one illustrative example, the driving data can include eye tracking camera image data of the rider. In such an example, the computing device (or component thereof, such as at least one processor) can determine, based on the eye tracking camera image data of the rider, that the rider is inattentive to the curve in the road. The computing device (or component thereof, such as at least one processor) can output, based on determining the rider being inattentive to the curve in the road, an alert to the rider via the HMD. In some cases, the alert can include a visual alert displayed on the display of the HMD, an audible alert output via a speaker of the HMD, a haptic alert output via the HMD and/or the vehicle, any combination thereof, and/or other type(s) of alert(s).

In some aspects, the vehicle and the HMD are communicatively coupled with each other via a wireless connection. In some cases, the at least one processor is a part of an electronic control unit (ECU) of the HMD or an ECU of the vehicle. The HMD can include an AR helmet configured to render and/or display AR content with driving guidance data and/or can include an AR device (e.g., AR glasses) worn by the rider.

At block 1220, the computing device (or component thereof, such as at least one processor) can determine, based on the driving data, driving guidance data for the rider for driving the vehicle through a curve in the road. In some aspects, the driving guidance data includes a recommended lean angle for the rider, a recommended speed for the vehicle, a recommended path to drive the vehicle within the curve in the road, any combination thereof, and/or other driving guidance data (e.g., feedback related to a maneuver through the curve after the maneuver is performed). For example, the driving guidance data can include a recommended lean angle for the rider. In such an example, the driving guidance data can include a shape (e.g., a rectangle, such as the rectangle shape 310 shown in FIG. 3) overlaid on an image of the road to indicate the recommended lean angle for the rider. In another example, the driving guidance data comprises a recommended speed for the vehicle. In such an example, the driving guidance data can include a number (e.g., the number 320 shown in FIG. 3) overlaid on an image of the road to indicate the recommended speed for the vehicle. In another example, the driving guidance data comprises a recommended path to drive the vehicle within the curve in the road. In such an example, the driving guidance data can include a virtual path overlaid on an image of the road to indicate the recommended path.

In some aspects, to determine the driving guidance data, the computing device (or component thereof, such as at least one processor) can determine initial driving guidance data for each point of a plurality of points of a poly-line (e.g., the poly-line 410 of FIG. 4) representing the curve in the road. For instance, in some examples, the plurality of points span a length of the curve in the road (e.g., as illustrated in FIG. 4). In some cases, to determine the driving guidance data, the computing device (or component thereof, such as at least one processor) can determine, based on the initial driving guidance data for each point of the plurality of points of the poly-line, final driving guidance data for each radius of a plurality of radii (e.g., radius r1, radius r2, radius r3 shown in FIG. 4) of the poly-line representing the curve in the road. In some cases, each radius of the plurality of radii comprises a respective portion of points of the plurality of points. For instance, as shown in FIG. 4, the poly-line 410 can be divided into sections (e.g., an entering curve-phase section 430*a*, an inside curve-phase section 430*b*, and an out of curve-phase section 430*c*) based on the different radii (e.g., radius r1, radius r2, radius r3), in which case each section has a respective radii. As shown in FIG. 4, the entering curve-phase section 430*a* has the radius r1 (e.g., and the points 420*a*, 420*b*, 420*c*), the inside curve-phase section 430*b* has the radius r2 (e.g., and the points 420*d*, 420*c*), and the out of curve-phase section 430*c* has the radius r3 (e.g., and the points 420*f*, 420*g*).

In some aspects, the computing device (or component thereof, such as at least one processor) can obtain crowd-sourced driving data from one or more other vehicles. The crowdsourced driving data can include information associated with the one or more other vehicles driving through the curve in the road. The computing device (or component thereof, such as at least one processor) can determine the driving guidance data further based on the crowdsourced driving data.

At block 1230, the computing device (or component thereof, such as at least one processor) can output the driving guidance data for display on a display of a head-mounted device (HMD) associated with the rider. In some cases, the computing device can include the display of the HMD. The display can display the driving guidance data.

In some cases, the computing device of process 1200 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device of process 1200 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1200 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 13 is a block diagram illustrating an example of a computing system 1300, which may be employed for guiding motorcycles into a curve using helmet AR. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some aspects, computing system 1300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300.

Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1340 may also include one or more range sensors (e.g., LiDAR sensors, laser range finders, RF radars, ultrasonic sensors, and infrared (IR) sensors) configured to collect data and provide measurements to processor 1310, whereby processor 1310 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some aspects, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for rider assistance, the apparatus comprising: at least one memory; and at least one processor coupled to the at least one memory and configured to: obtain driving data associated with at least one of a vehicle, a rider of the vehicle, or an environment of the vehicle while the rider is driving the vehicle on a road; determine, based on the driving data, driving guidance data for the rider for driving the vehicle through a curve in the road; and output the driving guidance data for display on a display of a head-mounted device (HMD) associated with the rider.

Aspect 2. The apparatus of Aspect 1, wherein, to determine the driving guidance data, the at least one processor is configured to determine initial driving guidance data for each point of a plurality of points of a poly-line representing the curve in the road.

Aspect 3. The apparatus of Aspect 2, wherein the plurality of points span a length of the curve in the road.

Aspect 4. The apparatus of any of Aspects 2 or 3, wherein, to determine the driving guidance data, the at least one processor is configured to determine, based on the initial driving guidance data for each point of the plurality of points of the poly-line, final driving guidance data for each radius of a plurality of radii of the poly-line representing the curve in the road.

Aspect 5. The apparatus of Aspect 4, wherein each radius of the plurality of radii comprises a respective portion of points of the plurality of points.

Aspect 6. The apparatus of any of Aspects 1 to 5, wherein the driving guidance data comprises at least one of a recommended lean angle for the rider, a recommended speed for the vehicle, or a recommended path to drive the vehicle within the curve in the road.

Aspect 7. The apparatus of any of Aspects 1 to 6, wherein the driving guidance data comprises a recommended lean angle for the rider, and wherein the driving guidance data comprises a shape overlaid on an image of the road to indicate the recommended lean angle for the rider.

Aspect 8. The apparatus of any of Aspects 1 to 7, wherein the driving guidance data comprises a recommended speed for the vehicle, and wherein the driving guidance data comprises a number overlaid on an image of the road to indicate the recommended speed for the vehicle.

Aspect 9. The apparatus of any of Aspects 1 to 8, wherein the driving guidance data comprises a recommended path to drive the vehicle within the curve in the road, and wherein the driving guidance data comprises a virtual path overlaid on an image of the road to indicate the recommended path.

Aspect 10. The apparatus of any of Aspects 1 to 9, wherein the at least one processor is configured to: obtain crowdsourced driving data from one or more other vehicles, the crowdsourced driving data including information associated with the one or more other vehicles driving through the curve in the road; and determine the driving guidance data further based on the crowdsourced driving data.

Aspect 11. The apparatus of any of Aspects 1 to 10, wherein the driving data comprises at least one of radar data of the environment of the vehicle, camera image data of the environment of the vehicle, gyroscope data associated with the vehicle, gyroscope data associated with the HMD, Global Positioning System (GPS) data indicating a location of at least one of the vehicle or the HMD, eye tracking camera image data of the rider, odometry data associated with the vehicle, traction data associated with vehicle, weather data associated with the environment of the vehicle, a current leaning angle of the rider, a current braking level associated with the vehicle, a current speed associated with the vehicle, or ultrasonic data associated with the vehicle.

Aspect 12. The apparatus of any of Aspects 1 to 11, wherein the driving data comprises eye tracking camera image data of the rider, and wherein the at least one processor is configured to: determine, based on the eye tracking camera image data of the rider, that the rider is inattentive to the curve in the road; and output, based on determining the rider being inattentive to the curve in the road, an alert to the rider via the HMD.

Aspect 13. The apparatus of Aspect 12, wherein the alert is at least one of a visual alert displayed on the display of the HMD, an audible alert output via a speaker of the HMD, or a haptic alert output via at least one of the HMD or the vehicle.

Aspect 14. The apparatus of any of Aspects 1 to 13, wherein the vehicle and the HMD are communicatively coupled with each other via a wireless connection.

Aspect 15. The apparatus of any of Aspects 1 to 14, wherein the at least one processor is a part of an electronic control unit (ECU) associated with the HMD or an ECU associated with the vehicle.

Aspect 16. The apparatus of any of Aspects 1 to 15, wherein the vehicle is a motorcycle, a bicycle, or a scooter.

Aspect 17. The apparatus of any of Aspects 1 to 16, wherein the HMD is a helmet or an augmented reality (AR) device worn by the rider.

Aspect 18. The apparatus of any of Aspects 1 to 17, further comprising the display, wherein the display is configured to display the driving guidance data.

Aspect 19. A method for rider assistance, the method comprising: obtaining, by a processor, driving data associated with at least one of a vehicle, a rider of the vehicle, or an environment of the vehicle while the rider is driving the vehicle on a road; determining, by the processor based on the driving data, driving guidance data for the rider for driving the vehicle through a curve in the road; and displaying, on a display of a head-mounted device (HMD) associated with the rider, the driving guidance data.

Aspect 20. The method of Aspect 19, wherein determining the driving guidance data comprises determining initial driving guidance data for each point of a plurality of points of a poly-line representing the curve in the road.

Aspect 21. The method of Aspect 20, wherein the plurality of points span a length of the curve in the road.

Aspect 22. The method of any of Aspects 20 or 21, wherein determining the driving guidance data further comprises determining, based on the initial driving guidance data for each point of the plurality of points of the poly-line, final driving guidance data for each radius of a plurality of radii of the poly-line representing the curve in the road.

Aspect 23. The method of Aspect 22, wherein each radius of the plurality of radii comprises a respective portion of points of the plurality of points.

Aspect 24. The method of any of Aspects 19 to 23, wherein the driving guidance data comprises at least one of a recommended lean angle for the rider, a recommended speed for the vehicle, or a recommended path to drive the vehicle within the curve in the road.

Aspect 25. The method of any of Aspects 19 to 24, wherein the driving guidance data comprises a recommended lean angle for the rider, and wherein the driving guidance data comprises a shape overlaid on an image of the road to indicate the recommended lean angle for the rider.

Aspect 26. The method of any of Aspects 19 to 25, wherein the driving guidance data comprises a recommended speed for the vehicle, and wherein the driving guidance data comprises a number overlaid on an image of the road to indicate the recommended speed for the vehicle.

Aspect 27. The method of any of Aspects 19 to 26, wherein the driving guidance data comprises a recommended path to drive the vehicle within the curve in the road, and wherein the driving guidance data comprises a virtual path overlaid on an image of the road to indicate the recommended path.

Aspect 28. The method of any of Aspects 19 to 27, further comprising: obtaining crowdsourced driving data from one or more other vehicles, the crowdsourced driving data including information associated with the one or more other vehicles driving through the curve in the road; wherein determining the driving guidance data is based on the crowdsourced driving data.

Aspect 29. The method of any of Aspects 19 to 28, wherein the driving data comprises at least one of radar data of the environment of the vehicle, camera image data of the environment of the vehicle, gyroscope data associated with the vehicle, gyroscope data associated with the HMD, Global Positioning System (GPS) data indicating a location of at least one of the vehicle or the HMD, eye tracking camera image data of the rider, odometry data associated with the vehicle, traction data associated with vehicle, weather data associated with the environment of the vehicle, a current leaning angle of the rider, a current braking level associated with the vehicle, a current speed associated with the vehicle, or ultrasonic data associated with the vehicle.

Aspect 30. The method of any of Aspects 19 to 29, wherein the driving data comprises eye tracking camera image data of the rider, the method further comprising: determining, by the processor based on the eye tracking camera image data of the rider, that the rider is inattentive to the curve in the road; and outputting, by the processor based on determining the rider being inattentive to the curve in the road, an alert to the rider via the HMD.

Aspect 31. The method of Aspect 30, wherein the alert is at least one of a visual alert displayed on the display of the HMD, an audible alert output via a speaker of the HMD, or a haptic alert output via at least one of the HMD or the vehicle.

Aspect 32. The method of any of Aspects 19 to 31, wherein the vehicle and the HMD are communicatively coupled with each other via a wireless connection.

Aspect 33. The method of any of Aspects 19 to 32, wherein the processor is a part of an electronic control unit (ECU) associated with the HMD or an ECU associated with the vehicle.

Aspect 34. The method of any of Aspects 19 to 33, wherein the vehicle is a motorcycle, a bicycle, or a scooter.

Aspect 35. The method of any of Aspects 19 to 34, wherein the HMD is a helmet or an augmented reality (AR) device worn by the rider.

Aspect 36. A non-transitory computer-readable medium having stored thereon instructions that, when executed by at least one processor, cause the at least one processor to perform operations according to any of Aspects 19 to 35.

Aspect 37. An apparatus for rider assistance, the apparatus including one or more means for performing operations according to any of Aspects 19 to 35.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for rider assistance, the apparatus comprising:

at least one memory; and at least one processor coupled to the at least one memory and configured to:

obtain driving data associated with at least one of a vehicle, a rider of the vehicle, or an environment of the vehicle while the rider is driving the vehicle on a road;

determine, based on the driving data, driving guidance data for the rider for driving the vehicle through a curve in the road; and output the driving guidance data for display on a display of a head-mounted device (HMD) associated with the rider, wherein the driving guidance data comprises a recommended lean angle for the rider, and wherein the driving guidance data comprises a shape overlaid on an image of the road to indicate the recommended lean angle for the rider.

2. The apparatus of claim 1, wherein, to determine the driving guidance data, the at least one processor is configured to determine initial driving guidance data for each point of a plurality of points of a poly-line representing the curve in the road.

3. The apparatus of claim 2, wherein the plurality of points span a length of the curve in the road.

4. The apparatus of claim 2, wherein, to determine the driving guidance data, the at least one processor is configured to determine, based on the initial driving guidance data for each point of the plurality of points of the poly-line, final driving guidance data for each radius of a plurality of radii of the poly-line representing the curve in the road.

5. The apparatus of claim 4, wherein each radius of the plurality of radii comprises a respective portion of points of the plurality of points.

6. The apparatus of claim 1, wherein the at least one processor is configured to:

obtain crowdsourced driving data from one or more other vehicles, the crowdsourced driving data including information associated with the one or more other vehicles driving through the curve in the road; and determine the driving guidance data further based on the crowdsourced driving data.

7. The apparatus of claim 1, wherein the driving data comprises at least one of radar data of the environment of the vehicle, camera image data of the environment of the vehicle, gyroscope data associated with the vehicle, gyroscope data associated with the HMD, Global Positioning System (GPS) data indicating a location of at least one of the vehicle or the HMD, eye tracking camera image data of the rider, odometry data associated with the vehicle, traction data associated with vehicle, weather data associated with the environment of the vehicle, a current leaning angle of the rider, a current braking level associated with the vehicle, a current speed associated with the vehicle, or ultrasonic data associated with the vehicle.

8. The apparatus of claim 1, wherein the driving data comprises eye tracking camera image data of the rider, and wherein the at least one processor is configured to:

determine, based on the eye tracking camera image data of the rider, that the rider is inattentive to the curve in the road; and output, based on determining the rider being inattentive to the curve in the road, an alert to the rider via the HMD.

9. The apparatus of claim 8, wherein the alert is at least one of a visual alert displayed on the display of the HMD, an audible alert output via a speaker of the HMD, or a haptic alert output via at least one of the HMD or the vehicle.

10. The apparatus of claim 1, wherein the vehicle and the HMD are communicatively coupled with each other via a wireless connection.

11. The apparatus of claim 1, wherein the at least one processor is a part of an electronic control unit (ECU) associated with the HMD or an ECU associated with the vehicle.

12. The apparatus of claim 1, wherein the vehicle is a motorcycle, a bicycle, or a scooter.

13. The apparatus of claim 1, wherein the HMD is a helmet or an augmented reality (AR) device worn by the rider.

14. The apparatus of claim 1, further comprising the display, wherein the display is configured to display the driving guidance data.

15. A method for rider assistance, the method comprising:

obtaining, by a processor, driving data associated with at least one of a vehicle, a rider of the vehicle, or an environment of the vehicle while the rider is driving the vehicle on a road;

determining, by the processor based on the driving data, driving guidance data for the rider for driving the vehicle through a curve in the road; and displaying, on a display of a head-mounted device (HMD) associated with the rider, the driving guidance data, wherein the driving guidance data comprises a recommended lean angle for the rider, and wherein the driving guidance data comprises a shape overlaid on an image of the road to indicate the recommended lean angle for the rider.

16. The method of claim 15, wherein determining the driving guidance data comprises:

determining initial driving guidance data for each point of a plurality of points of a poly-line representing the curve in the road, wherein the plurality of points span a length of the curve in the road; and determining the driving guidance data further comprises determining, based on the initial driving guidance data for each point of the plurality of points of the poly-line, final driving guidance data for each radius of a plurality of radii of the poly-line representing the curve in the road.

* * * * *